(12) United States Patent
Perry et al.

(10) Patent No.: US 9,993,729 B2
(45) Date of Patent: Jun. 12, 2018

(54) USER SAVE DATA MANAGEMENT IN CLOUD GAMING

(71) Applicant: Sony Interactive Entertainment America LLC, San Mateo, CA (US)

(72) Inventors: David Perry, San Mateo, CA (US); Christian Rickeby, San Mateo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 152 days.

(21) Appl. No.: 15/011,283

(22) Filed: Jan. 29, 2016

(65) Prior Publication Data

US 2017/0050111 A1 Feb. 23, 2017

Related U.S. Application Data

(63) Continuation-in-part of application No. 14/845,104, filed on Sep. 3, 2015.

(60) Provisional application No. 62/273,007, filed on Dec. 30, 2015, provisional application No. 62/207,285, filed on Aug. 19, 2015.

(51) Int. Cl.
*A63F 13/352* (2014.01)
*A63F 13/355* (2014.01)
*H04L 29/08* (2006.01)
*H04L 29/06* (2006.01)
*A63F 13/30* (2014.01)

(52) U.S. Cl.
CPC .......... *A63F 13/355* (2014.09); *A63F 13/352* (2014.09); *H04L 65/4084* (2013.01); *H04L 65/80* (2013.01); *H04L 67/10* (2013.01); *H04L 67/38* (2013.01); *A63F 13/30* (2014.09)

(58) Field of Classification Search
CPC .............. A63F 2300/50; A63F 2300/51; A63F 2300/538
See application file for complete search history.

(56) References Cited

U.S. PATENT DOCUMENTS

2009/0325690 A1 12/2009 Zhou et al.
2013/0210528 A1 8/2013 Pereira et al.
2015/0126282 A1 5/2015 Hitomi et al.
(Continued)

FOREIGN PATENT DOCUMENTS

WO 2005117391 A1 12/2005
WO 2010111102 A1 9/2010

*Primary Examiner* — Damon Pierce
(74) *Attorney, Agent, or Firm* — Martine Penilla Group, LLP

(57) ABSTRACT

A method is provided, including: receiving, over a network by a cloud gaming server computer, a request from a client device to initiate gameplay of a cloud video game; responsive to the request, assigning the client device to a first data center from which to stream the gameplay of the cloud video game; responsive to the request, initiating transfer of user save data over the network from a second data center to the first data center; loading the cloud video game on a cloud gaming machine at the first data center, the loading of the cloud video game including loading of generic save data; initiating interactive gameplay of the cloud video game with the generic save data; during the interactive gameplay, completing the transfer of the user save data to the first data center; applying the user save data to update the execution of the cloud video game.

18 Claims, 19 Drawing Sheets

(56) References Cited

U.S. PATENT DOCUMENTS

2015/0375113 A1* 12/2015 Justice ................. A63F 13/355
                                                                               463/42
2017/0050111 A1    2/2017 Perry et al.

* cited by examiner

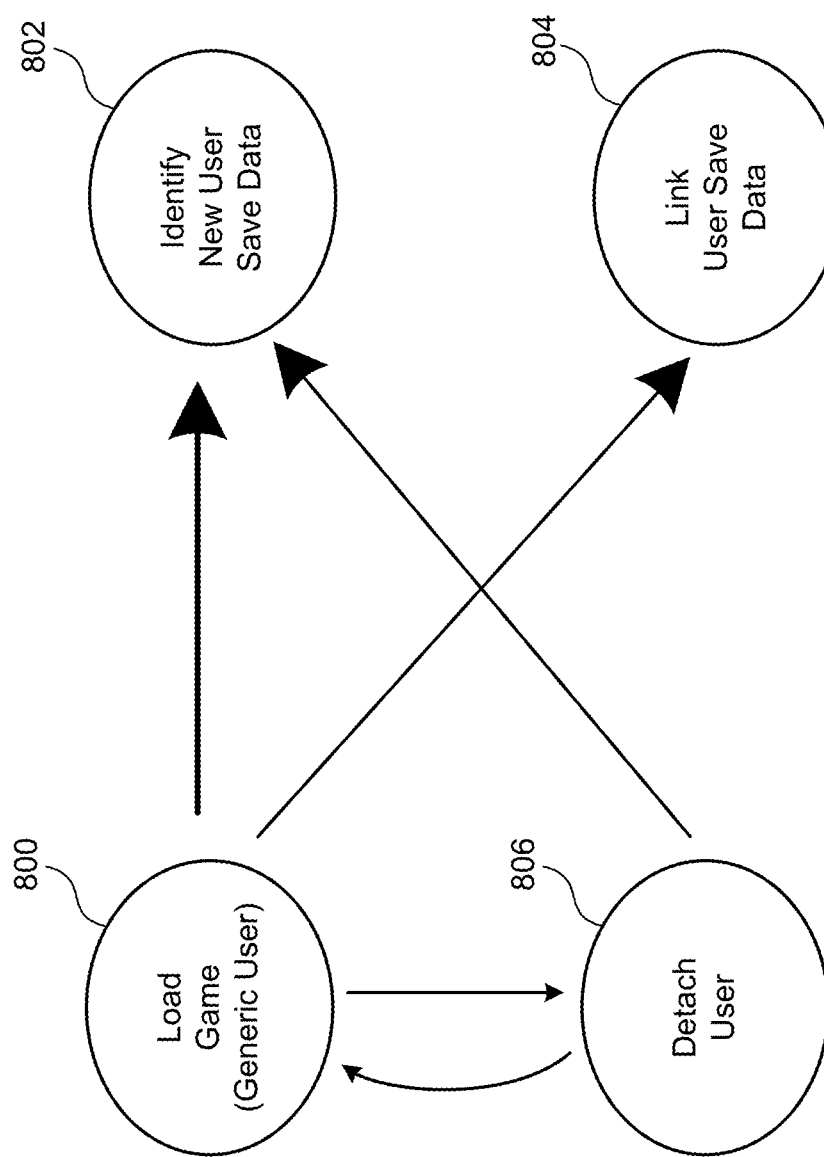

USER SAVE DATA MANAGEMENT IN CLOUD GAMING

CLAIM OF PRIORITY

This application claims priority to U.S. Provisional Application No. 62/273,007, filed Dec. 30, 2015, entitled "User Save Data Management in Cloud Gaming. This application claims priority as a continuation-in-part of U.S. application Ser. No. 14/845,104, filed Sep. 3, 2015, entitled "Local Application Quick Start with Cloud Transitioning," which claims priority to U.S. Provisional Patent Application No. 62/207,285, filed Aug. 19, 2015, entitled "Local Application Quick Start with Cloud Transitioning." The disclosures of these applications are incorporated by reference herein.

FIELD OF THE DISCLOSURE

The present disclosure relates to systems and methods for user save data management in cloud gaming, and more specifically to initiation of gameplay of a cloud video game simultaneous with migration of user save data for the cloud video game.

BACKGROUND

Description of the Related Art

A current area of rapidly growing technology is the field of cloud gaming. Users are able to access a number of games on a cloud gaming site over a network, such as the Internet, and begin interaction/playing the game. In order to select a game for game play, a user accesses his/her account on the cloud gaming site. The user is provided with a list of games that are available for the user account for game play. When the user selects a game for viewing and/or game play, the user will have to wait till the user account is assigned to a cloud gaming machine, the game code is loaded, graphics engines initialized, graphics are loaded, game and user settings are uploaded, etc., before he can access the game for game play, for example. Furthermore, as the progression through initial content of the video game is generally a linear process, the user will be required to wait after each selection point or other break point in the initial content of the video game, as the subsequent content is loaded, executed, and streamed to the users client device. The wait time for accessing and playing a select game may be longer for games that are graphic intensive. The waiting may cause the user to lose interest in the game and to stop interacting with the game site, resulting in a potential loss to the game developer/game site owner.

Furthermore, a user's save data for a video game may need to be migrated from a prior data center to a currently assigned data center. As the user's save data can be quite extensive, this process can cause a significant delay to the initiation of gameplay.

It is within this context that embodiments of the disclosure arise.

SUMMARY OF THE DISCLOSURE

Implementations of the present disclosure provide methods and systems that are used to provide cloud-based video games, and more specifically provide for management of user save data to allow quick initiation of gameplay, concurrent with transfer of user save data for the cloud video game to the data center from which gameplay is streamed.

When a user plays a cloud video game, user save data is generated that can include any user-specific data for the video game. This user save data can be quite extensive and transfer of user save data from one data center to another data center in a cloud gaming architecture can require significant amounts of time. If a user is not assigned to the data center where his/her user save data for a given video game is stored, then this transfer can cause undesirable delay to the initiation of gameplay of the given video game. Thus, implementations of the present disclosure provide for loading of generic game data in place of the user save data, to allow the user to initiate gameplay, simultaneous with the transfer of the user save data from its prior location to the current data center location from which gameplay is streamed. When the transfer of user save data is complete, or as it is completed in stages, the user save data is integrated into the execution of the video game.

In accordance with some implementations, a method is provided, comprising: receiving, over a network by a cloud gaming server computer, a request from a client device to initiate gameplay of a cloud video game; responsive to the request, assigning the client device to a first data center from which to stream the gameplay of the cloud video game; responsive to the request, initiating transfer of user save data, that is for the cloud video game and is associated with a user account associated with the client device, over the network from a second data center to the first data center; loading the cloud video game on a cloud gaming machine at the first data center, the loading of the cloud video game including loading of generic save data; initiating interactive gameplay of the cloud video game with the generic save data by streaming video data, generated from execution of the cloud video game by the cloud gaming machine, to the client device, and receiving input data from the client device to drive the execution of the cloud video game; during the interactive gameplay, completing the transfer of the user save data to the first data center; applying the user save data to update the execution of the cloud video game.

In some implementations, the generic save data includes first values for one or more variables defined by the execution of the cloud video game, the generic save data not being associated with a specific user.

In some implementations, the user save data includes second values for the one or more variables, the second values being defined from a prior execution of the cloud video game that was associated with the user account, the applying of the user save data including updating the one or more variables with the second values.

In some implementations, applying the user save data to update the execution of the cloud video game is performed during the interactive gameplay, such that execution of the cloud video game and the interactive gameplay continue as the user save data is applied to update the one or more variables.

In some implementations, applying the user save data to update the execution of the cloud video game includes identifying a break point in the cloud video game, wherein the execution of the cloud video game and the interactive gameplay are paused, and applying the user save data for gameplay during the break point in the cloud video game.

In some implementations, loading the cloud video game on the cloud gaming machine is performed in response to the request from the client device to initiate gameplay of the cloud video game.

In accordance with some implementations, a method is provided, comprising: receiving, over a network by a cloud gaming server computer, a request from a client device to initiate gameplay of a cloud video game; assigning the client device to a data center from which to stream the cloud video game; loading a cloud gaming machine at the data center with the cloud video game; substantially simultaneous with the loading of the cloud gaming machine, performing a stream test between the data center and the client device to determine a quality of service of the streaming of the cloud video game; after completion of the loading of the cloud gaming machine and the performance of the stream test, initiating interactive gameplay of the cloud video game by streaming video data, generated from execution of the cloud video game by the cloud gaming machine, to the client device, and receiving input data from the client device to drive the execution of the cloud video game.

In some implementations, streaming video data to the client device is performed by a video server of the data center, the video server receiving video content generated by the execution of the cloud video game by the cloud gaming machine, the video server encoding the video content to generate the video data to be streamed to the client device.

In some implementations, performing the stream test includes establishing a connection over the network between the video server and the client device, and testing the connection for the streaming of the video data or the receiving of the input data.

In some implementations, one or more parameters for the encoding of the video content by the video server are determined from results of the testing of the connection between the video server and the client device.

In some implementations, the parameters for the encoding of the video content include a rate of compression of the video content.

In some implementations, the method further includes: substantially simultaneous with the loading of the cloud gaming machine, determining a hardware or software configuration of the client device for the streaming of the cloud video game.

In accordance with some implementations, a method is provided, comprising: receiving, over a network by a cloud gaming server computer, a request from a client device to initiate gameplay of a cloud video game; assigning the client device to a first data center from which to stream the cloud video game, the first data center including a first cloud gaming machine; loading the first cloud gaming machine with the cloud video game; initiating interactive gameplay of the cloud video game by streaming video data, generated from execution of the cloud video game by the first cloud gaming machine, to the client device, and receiving input data from the client device to drive the execution of the cloud video game; substantially simultaneous with the loading of the cloud video game or the interactive gameplay of the cloud video game, evaluating a quality of service between the client device and the first data center, and evaluating a quality of service between the client device and a second data center; responsive to determining that the quality of service between the client device and the second data center is greater than the quality of service between the client device and the first data center, migrating the execution of the cloud video game over the network from the first gaming machine at the first data center to a second gaming machine at the second data center.

In some implementations, migrating the execution of the cloud video game includes loading the second gaming machine with the cloud video game, and transferring game state data, that is defined from the execution of the cloud video game by the first cloud gaming machine, over the network to the second gaming machine.

In some implementations, migrating the execution of the cloud video game includes identifying a break point in the cloud video game, wherein the execution of the cloud video game and the interactive gameplay are paused, and migrating the execution of the cloud video game when the execution of the cloud video game reaches the break point in the cloud video game.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

FIG. 8A conceptually illustrates a method for providing gameplay of a cloud video game without loading the video game save data for a given user prior to initiating gameplay of the cloud video game, in accordance with implementations of the disclosure.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Several operations are performed by a server(s) within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to a user. Game data associated with a game includes generic game data and user-specific game data. Therefore, initializing the files includes identifying, loading, and initializing generic game data and user-specific game data. Initializing generic game data may include initializing a graphics engine, installing graphics data, initializing sound files, installing art work, etc. Initializing user specific data may include locating, transferring, and installing user data, user history, game history, etc. Loading of the generic game data and/or user specific data may take anywhere from a few seconds to a few minutes depending on the complexity of the game/graphics of the game.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, the audio content may be rendered and a selection/navigation screen is presented for user selection/customization. User selection input provided at the selection/navigation screen may include game level selection, game icon(s) selection, game mode selection, game winnings, other user-related data that may require uploading of additional game content. Uploading of user selection input can cause additional delay before the game content is made available to the user for game play.

In some embodiments, game content is made available by streaming the game content from the game cloud system to a user's computing device for viewing and interacting. After loading user specific data, the game content is available for game play.

Figure 1A:
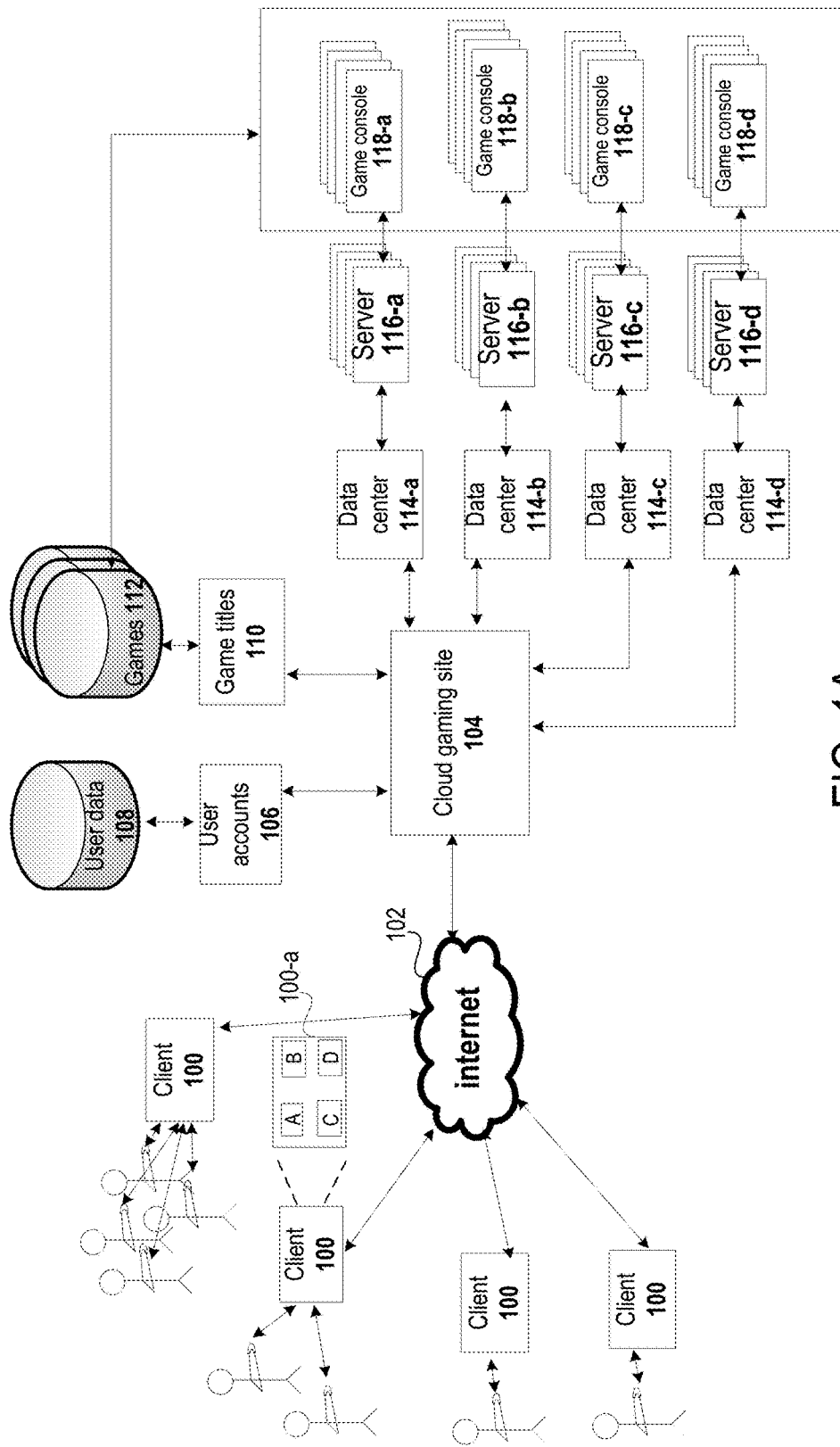
FIG. 1A illustrates a simplified block diagram of an exemplary system that is used to preload game content onto a cloud game server, in accordance with an embodiment of the present disclosure.

FIG. 1A illustrates an exemplary system used to load game files for a game available through a cloud gaming site. The system includes a plurality of client devices 100 that are communicatively connected to the cloud gaming site 104 over a network 102, such as the Internet. When a request to access the cloud gaming site 104 is received from a client device 100, the cloud gaming site 104 accesses user account information 106 stored in a user data store 108 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 110 to identify the game titles that are available at the game cloud site for the user account initiating the request. The game titles data store 110, in turn, interacts with a games database 112 to obtain the game titles for all the games that are available for the cloud gaming site. As new games are introduced, the games database 112 will be updated with the game code and the game titles data store 110 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 100-a, as shown in FIG. 1A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 1B:
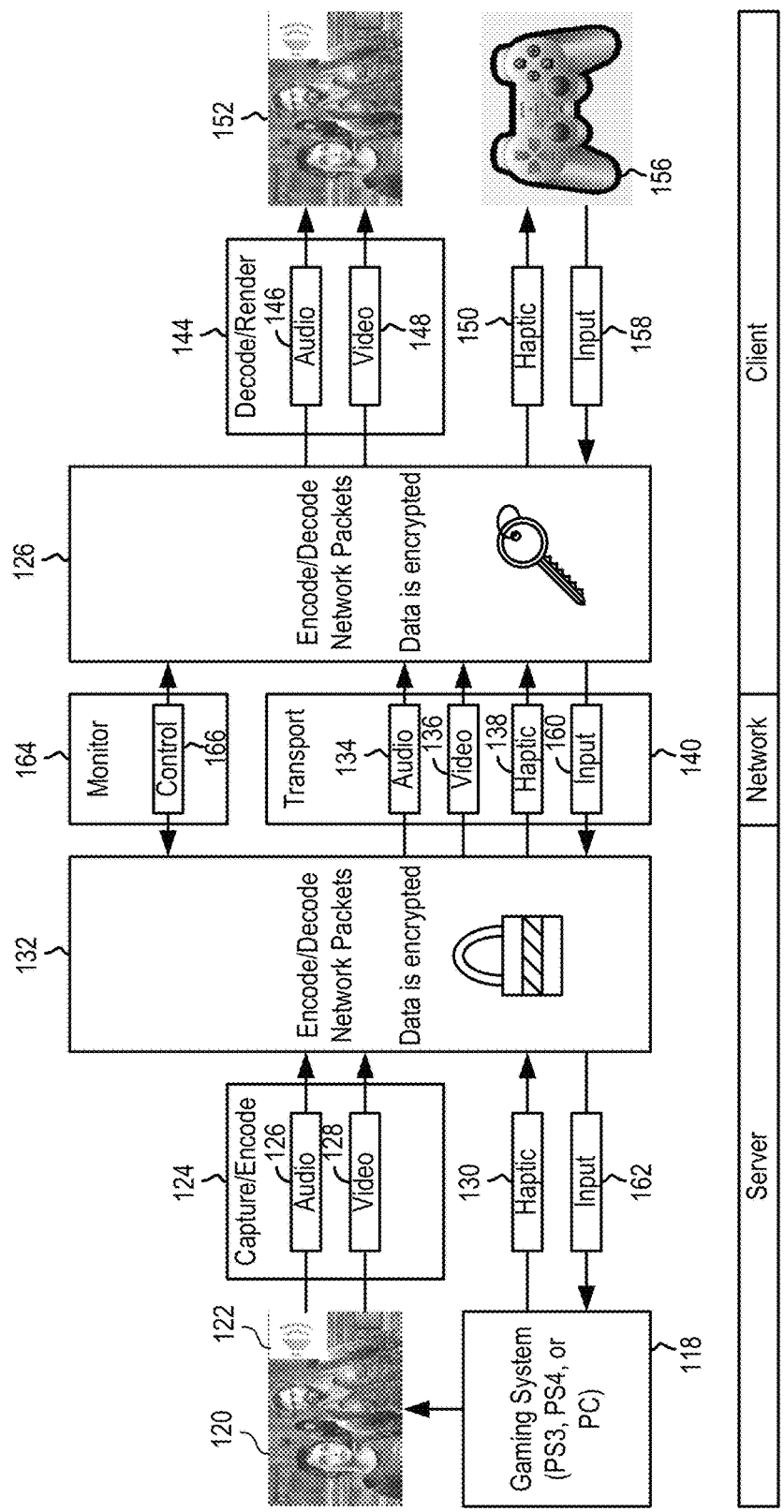
FIG. 1B is a flow diagram conceptually illustrating various operations which are performed for streaming a cloud video game to a client device, in accordance with implementations of the disclosure.

FIG. 1B is a flow diagram conceptually illustrating various operations which are performed for streaming a cloud video game to a client device, in accordance with implementations of the disclosure. The gaming system 118 executes a video game and generates raw (uncompressed) video 120 and audio 122. The video 120 and audio 122 are captured and encoded for streaming purposes, as indicated at reference 124 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 126 and encoded video 128 are further packetized into network packets, as indicated at reference numeral 132, for purposes of transmission over a network such as the Internet. The network packet encoding process can also employ a data encryption process, thereby providing enhanced data security. In the illustrated implementation, audio packets 134 and video packets 136 are generated for transport over the network, as indicated at reference 140.

The gaming system 118 additionally generates haptic feedback data 130, which is also packetized into network packets for network transmission. In the illustrated implementation, haptic feedback packets 138 are generated for transport over the network, as further indicated at reference 140.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 140, the audio, video, and haptic feedback packets are transported over a network, such as and/or including the Internet. As indicated at reference 142, the audio packets 134, video packets 136, and haptic feedback packets 138, are decoded/reassembled by the client device to define encoded audio 146, encoded video 148, and haptic feedback data 150 at the client device. If the data has been encrypted, then the network packets are also decrypted. The encoded audio 146 and encoded video 148 are then decoded by the client device, as indicated at reference 144, to generate client-side raw audio and video data for rendering on a display device 152. The haptic feedback data 150 can be processed/communicated to produce a haptic feedback effect at a controller device 156 or other interface device through which haptic effects can be rendered. One example of a haptic effect is a vibration or rumble of the controller device 156.

It will be appreciated that a video game is responsive to user inputs, and thus, a similar procedural flow to that described above for transmission and processing of user input, but in the reverse direction from client device to server, can be performed. As shown, a user operating controller device 156 may generate input data 158. This input data 158 is packetized at the client device for transport over the network to the cloud gaming system. The input data packets 160 are unpacked and reassembled by the cloud gaming server to define input data 162 on the server-side. The input data 162 is fed to the gaming system 118, which processes the input data 162 to update the game state of the video game.

During transport (ref. 140) of the audio packets 134, video packets 136, and haptic feedback packets 138, the transmission of data over the network can be monitored to ensure the cloud game stream quality of service. For example, network conditions can be monitored as indicated by reference 164, including both upstream and downstream network bandwidth, and the game streaming can be adjusted in response to changes in available bandwidth. That is, the encoding and decoding of network packets can be controlled based on present network conditions, as indicated by reference 166.

Figure 2:
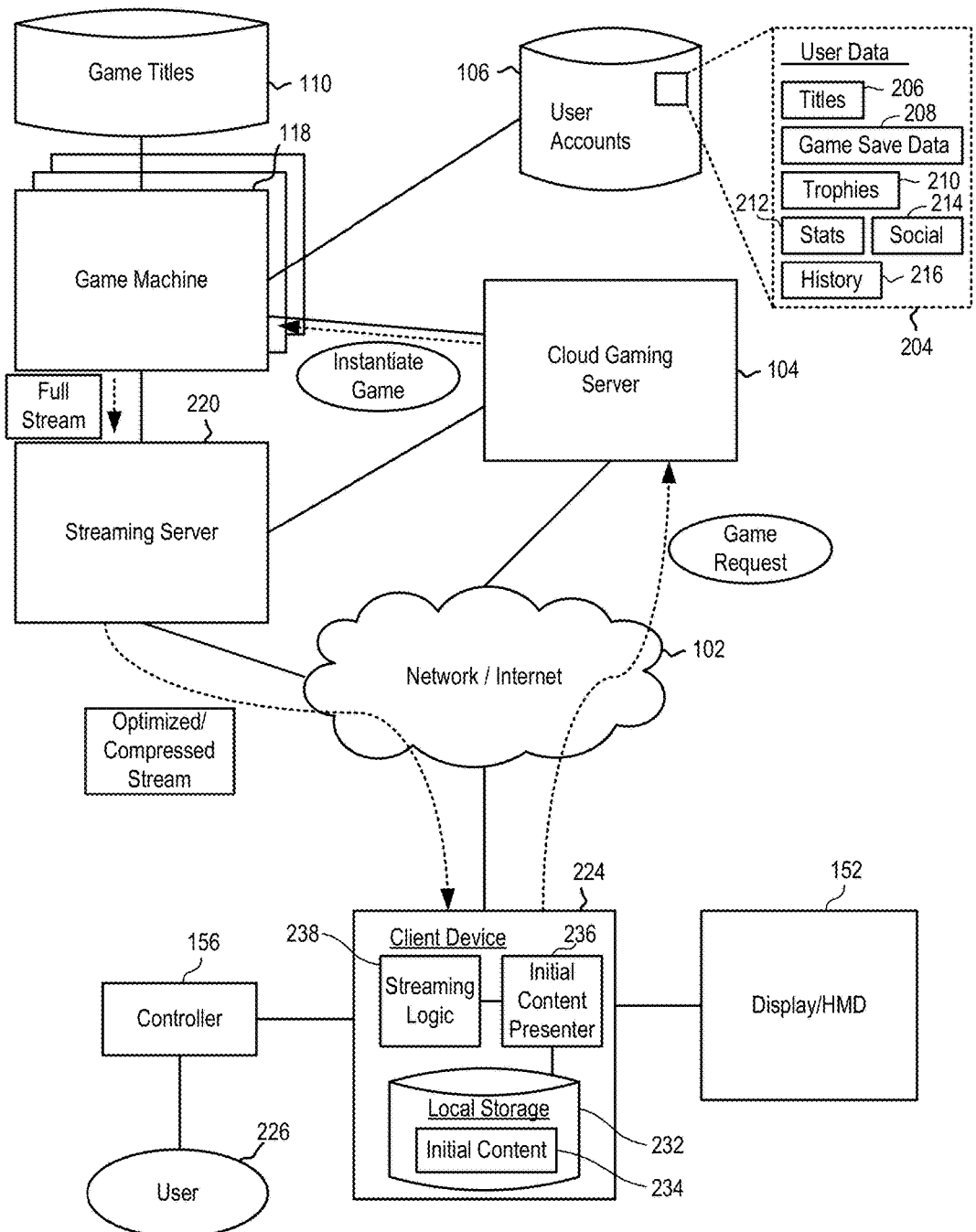
FIG. 2 conceptually illustrates a system for cloud gaming with local application quick start functionality, in accordance with implementations of the disclosure.

FIG. 2 conceptually illustrates a system for cloud gaming with local application quick start functionality, in accordance with implementations of the disclosure. The user 226 interacts with a client device 100 that is configured to access a cloud gaming service. The user 226 may operate a controller device 156 to generate and provide input to the client device 100. Furthermore, the client device 100 can be configured to render content to a display device 152. It will be appreciated that in some implementations, the display device 152 can be a head-mounted display.

The client device communicates over network 102 to a cloud gaming server 104, which provides access to the user's cloud gaming account. The cloud gaming server 104 retrieves user data 204 from a user accounts storage 106, the user data 204 being specific for the user 226 in the illustrated embodiment. By way of example, the user data 204 can include various cloud gaming related data such as titles 206 which are the available game titles for gameplay by the user. These may be game titles which the user has purchased, rented, borrowed, been awarded, or to which the user has otherwise obtained access for gameplay. The user data may also include game save data 208, trophies 210, statistics 212, social data 214 (e.g. including social graph data), and history data 216 (e.g. user access history, gameplay history, etc.).

When the user 226 wishes to play a given cloud video game to which the user has access permission, the user may indicate selection of the video game on a graphical user interface (GUI) presented by the client device 100 on the display 152. Upon selection of the video game for gameplay, a game request is transmitted from the client device 100 to the cloud gaming server 104. The game request may identify the game title that the user wishes to play. In response to receiving the game request, the cloud gaming server 104 activates a cloud game machine 118 to instantiate the requested video game title. That is, the cloud game machine 118 is assigned to the requesting client device 100, and begins executing the requested video game title.

Simultaneous with the communication of the game request by the client device 100 to the cloud gaming server 104, the client device 100 also begins rendering initial content 234 from a local storage 232. An initial content presenter 236 manages the retrieval, rendering, and interactivity with the initial content 234. The initial content 234 can be specific to the requested video game, and may include any game-related content that may be presented to the user preceding the commencement of interactive gameplay of the video game.

For purposes of the present disclosure, interactive gameplay shall refer to interactivity between the user and the executing video game that is directly capable of substantively advancing the progress of the user within the competitive/narrative context of the video game. Thus, interactive gameplay of the video game does not include other types of content renderings or game-related interactions such as start-up images/videos, splash/loading screens or videos, legal information screens, accessing or configuring game settings (e.g. controller settings, game difficulty, video settings, audio settings, etc.), game selection menus (e.g. saved game selection, game level selection, game type selection (e.g. arcade, campaign), etc.), and/or any other type of game-related content or interactive feature that is not directly capable of advancing the user's progress within the competitive or narrative context of the video game.

As noted, the initial content 234 of the video game includes content that is presented prior to commencement of interactive gameplay. The initial content 234 can include such content as logo screens, startup/splash screens (images or animations/videos), legal information/disclaimer screens, peripheral device configuration menus, feature setting menus, etc. Since the initial content 234 is locally accessible from the local storage 232, the rendering of the initial content 234 can occur every quickly, and may be practically immediate or instantaneous in very fast systems. The user does not have to wait for the cloud gaming system—to provision/assign a game machine 118 for the client 100, load the appropriate video game code to the assigned game machine 118, begin execution of the video game code, and/or initiate streaming to the client 100—before content of the video game is rendered to the display device 152. This provides for a local quick start to the video game, while the cloud gaming system readies the game machine 118 for game streaming. Thus, the user is provided initial content with which to engage and enjoy, rather than being forced to wait for the cloud gaming system's operations which could be perceived as a poor cloud gaming experience.

The game machine 118 obtains the requested game title code from game titles data store 110, and executes the game title code to define the executing video game. The raw video/audio output from the game machine 118 is provided to a streaming server 220, which encodes the raw video/audio to a compressed format for streaming purposes. As noted above, the encoded audio and video can be transmitted over network 102 in accordance with network communication protocols. Streaming logic 238 at the client device 224 processes the incoming streaming audio/video for rendering to the display 152.

It will be appreciated that a transition will occur from presentation of the initial content 234 from the local storage 232 to presentation of the streamed video game from cloud-based game machine 118 via streaming server 220. In some implementations, the execution of the video game at the game machine 118 proceeds until a certain point is reached, at which point the video game awaits a trigger to initiate streaming of the video game to the client device 100. In some implementations, the trigger to initiate streaming may be defined from a user input received at the client device 100. For example, the user may press a button or provide some other input via the controller 156 to initiate streaming.

The transition from local execution/presentation of content to cloud streaming of content can be configured to provide a smooth user experience. The execution of the video game by the game machine 118 can be synchronized to the presentation of initial content at the client device. The game machine 118 may receive status updates from the client device 224 regarding the presentation of the initial content, and the execution of the video game by the cloud game machine 118 can be adjusted so as to be synchronized with the presentation of the initial content 234, and therefore allow for a smooth transition to cloud streaming. It will be appreciated that in some implementations, the transition from local content to streaming content occurs automatically without requiring user input, whereas in other implementations, the transition occurs in response to user input.

The transition from rendering of the initial content to streaming of the video game from the cloud may occur at various points in the overall game presentation. For example, the transition may occur following rendering of a splash screen (image/animation/video), or following rendering of a menu or other content requiring an active selection or input by the user. In the latter concept, the user selection (e.g. of a menu item or option) or input can be communicated to the executing video game at the game machine 118, which may process the selection/input to determine the next content to be rendered. In some implementations, the next content to be rendered will be another splash screen or menu, and thus the transition from local execution of initial content to cloud video game streaming occurs in between screens/menus presented prior to the initiation of interactive gameplay. In some implementations, the cloud game machine 118 can receive a status update regarding which of several screens is being presented at the client device 224, and the game machine 118 can be directed to execute and render the next screen, which will be streamed to the client device 224.

In some implementations, the transition occurs during the presentation of a single content screen. For example, the initial content 234 might include a plurality of screens which are presented in series. During the local presentation of the screens, cloud game machine 118 can receive status updates indicating which screens are being presented, and the cloud game machine 118 can be directed to execute and render the same screen as that which is currently being presented by the client device 224. The transition to streaming can thus occur during the presentation of the current screen, and may appear seamless to the user. In some implementations, the image/video portion of the screen content is transitioned to streaming first, whereas the audio is not transitioned until the presentation of the next screen. In some implementations, wherein the audio is defined by looped playback of an audio clip, the transition (of both the video and audio, or the audio only) may occur when the audio playback reaches the end of the clip. Such a configuration can avoid audible breaks in the audio presentation.

In some implementations, the trigger to initiate streaming of the video game also triggers initiation of interactive gameplay of the video game. For example, the initiation content can include all content of the video game that is to be presented to the user prior to initiating actual interactive gameplay. Then, at the point of initiating interactive gameplay, the client device 100 transitions from presenting locally stored content to presenting cloud-based streaming content. Further, it will be appreciated that user interactions with the initial content, such as user selections or other user inputs, can be communicated to the executing video game. In this manner, interactions with locally stored content can be used to drive the execution of the cloud-based video game. For example, the user may indicate a menu selection and this will be communicated to the executing video game on the game machine 118. The presentation of the menu will be from the local storage 232; however, following the user selection from the menu, the user selection may be communicated to the game machine 118 (e.g. via cloud gaming server 104) and the game machine 118 may process the user selection. The client device 100 may also transition to streaming the result of the user selection (e.g. to initiate interactive gameplay of the video game) from the game machine 118 via streaming server 220.

As will be appreciated by those skilled in the art, the executing video game may define a game engine which receives input, and processes the input to update the game state of the video game. In some implementations, the game engine of the video game is initialized at the game machine 118, while the initial content 234 is being presented at the client device. The game engine may be initialized and then entered into a paused state, as the game machine awaits a trigger to continue execution of the game engine. Upon receipt of the trigger, which can be defined from a user input, the paused state is exited and the resulting execution of the game engine provides for the initiation of interactive gameplay of the video game.

In some implementations, the client device 224 can be configured to communicate status updates to the cloud gaming system regarding the presentation of the initial content 234. Such status updates can include information identifying a current state of presentation of the initial content, as well as user inputs/selections/navigation. In response to such status updates, the execution of the video game by the game machine 118 can be directed to perform any of various options within the context of the video game. The transition between rendering of initial content 234 by the client device 224 to streaming of the video game from the streaming server 220 can thus be managed and synchronized to provide a smooth user experience.

In some implementations, the initialization of the game engine at the game machine can be configured to automatically load the user's last saved game data, as in many cases, a user will typically wish to continue gameplay from their last saved location. It will be appreciated that this automatic loading of the user's last saved game data can occur preemptively, before the user even indicates (e.g. through navigation/selection of game menus/options) that he/she wishes to continue gameplay of their last saved game. This is made possible through the division of processing wherein the client device processes and renders initial content while the cloud-based game machine initializes the game engine for eventual interactive gameplay. The presently described configuration thus provides an advantage over the gaming experience of even conventional console games, as the user is not required to wait for their local device to sequentially load the initial content and then load their saved game, for they are respectively handled in parallel by each of the local client device 100 and the cloud-based game machine 118.

In some implementations, the cloud gaming server 104 can be configured to determine whether or not to preemptively load the last saved game for a given video game based on the user's gameplay history. For example, in some implementations, the system may be configured to automatically load the user's last saved game if during the user's last gameplay session of the video game, the user loaded the previously last saved game. In a related implementation, the system may be configured to automatically load the user's last saved game if less than a threshold amount of time has elapsed since the last gameplay session, and during the user's last gameplay session of the video game, the user loaded the previously last saved game. In other implementations, the system may be configured to determine whether or not to automatically load the user's last saved game based on various factors such as social network activity, time of day, length of time since last gameplay, relative amount of gameplay of saved games versus non-saved games (e.g. arcade, multi-player) of the video game, etc.

In the illustrated implementation, during interactive gameplay the game machine 118 executes the game engine to generate full uncompressed streams of video and audio data. The streaming server 220 receives the full video and audio data streams, and processes them for transmission over the network 102 to the client device 100. The processing may entail encoding the video and audio data into a compressed format, encrypting the compressed data, and packetizing the data in accordance with network protocols for transmission. The client device 100 receives the transmitted data, reassembles the network packets, and decrypts and decodes the compressed video/audio data for rendering to a display/HMD 152 and an audio device (which may be part of the display 152).

In the above-described implementation, the streaming server streams a compressed version of the full video and audio streams to the client device 100. In some implementations, as discussed in further detail below, the streaming server 220 may be configured to stream versions of the full video and audio streams that are also optimized in other ways. As will be discussed, the streamed video and audio may be configured to have certain content portions/assets left out, which are later supplied at the client 100, so that less bandwidth is required for game streaming or so that the remainder of the streamed video and audio may be streamed at higher fidelity (e.g. higher frame-rate or sample rate, higher resolution, etc.).

Figure 3:
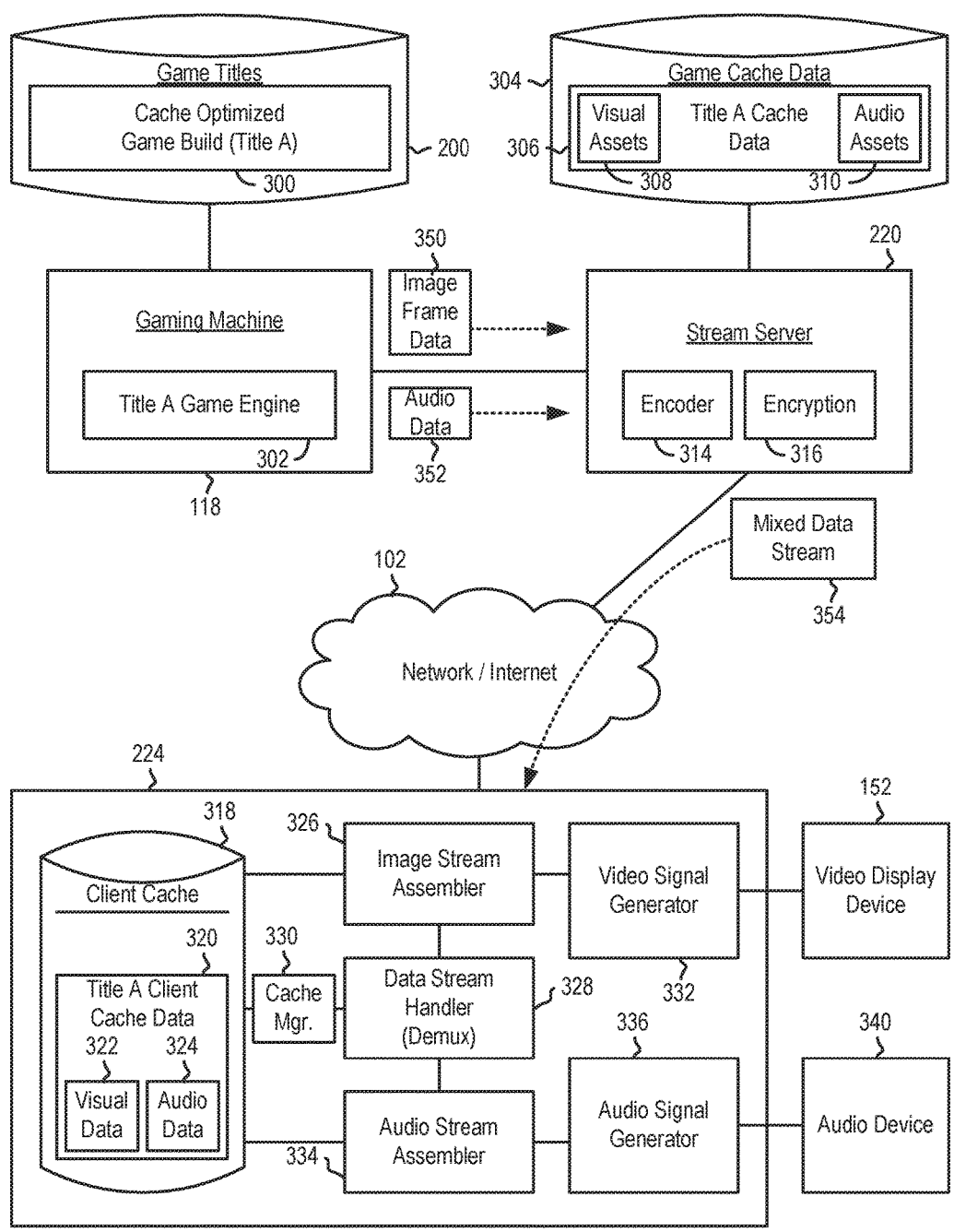
FIG. 3 illustrates a system for providing cache-optimized cloud gaming, in accordance with implementations of the disclosure.

FIG. 3 illustrates a system for providing cache-optimized cloud gaming, in accordance with implementations of the disclosure. Broadly speaking, the illustrated system is configured so that image or audio portions of the video game are stored at the client device, and combined with the streamed video or audio at the client device just prior to rendering on the display, thereby reducing the bandwidth required to stream the video game. The portions to be stored at the client device can be transferred to the device during time periods when there is available bandwidth, as determined from monitoring bandwidth utilization for game streaming and/or network conditions.

In the illustrated implementation, the gaming machine 118 executes a cache optimized game build 300 of a video game (Title A) that is stored in game titles storage 110. The cache optimized game build 300 is a specialized version of the video game title that is configured to provide for the cache-optimized game streaming functionality herein described. In particular, the cache optimized game build 300 is configurable to output video and audio data streams that exclude certain visual or audio components of the video game, which thereby reduces the data size of the video and audio data streams.

The execution of the game build 300 by the game machine 118 defines a game engine 302, that receives and processes inputs to update a game state, and outputs image frame data 350 and audio data 352. The game engine 302 can be configured to optionally exclude certain visual or audio content/assets from the image frame data 350 or audio data 352 that it outputs. For an excluded visual asset, the game engine 302 may generate a visual asset identifier that identifies the excluded visual asset and may further define parameters which control its presentation, such as its placement within the image frame data (defining its temporal location and spatial location), size, orientation, color(s), brightness/contrast, other visual properties, etc. For an excluded audio asset, the game engine 302 may generate an audio asset identifier that identifies the excluded audio asset and may further define parameters which control its presentation, such as volume, balance/fader parameters, placement, equalization parameters, etc. The visual/audio asset identifiers may accompany or be included as part of the image frame data 350 or audio data 352, and serve to indicate what visual or audio asset is to be assembled with the image/audio streams when processed at the client device 100.

A streaming server 220 receives the raw image frame data 350 and audio data 352 which are generated by the game machine 118. An encoder 314 encodes the image frame data 350 and the audio data 352 in compressed video/audio formats. An encryption module 316 encrypts the compressed video/audio for transmission over the network 102. The streaming server 220 is also configured to transmit cache data 306 for the video game from a game cache data storage 304 to the client device 100. The cache data 306 can include visual content/assets 308 and/or audio content/assets 310, which are cacheable content/assets defined for the video game which can be stored at the client device for later assembly with video/audio streams. Thus, the streaming server 220 sends a mixed data stream 354 that can include the compressed video/audio as well as client cacheable visual and/or audio content/assets. It will be appreciated that the encryption module 316 can also encrypt the visual/audio assets for inclusion in the mixed data stream 354 for transmission over the network 102.

The particular timing of the inclusion of visual/audio assets in the mixed data stream 354 can be determined based on current bandwidth usage and network conditions. In some implementations, the streaming server 220 is configured to monitor current bandwidth usage by the streaming of the mixed data stream 354 and determine when available bandwidth exists for streaming the visual/audio assets in addition to the compressed video/audio streams. The streaming server 220 may determine initial network conditions and monitor network conditions on an ongoing basis during game streaming, and the network conditions may be referenced in conjunction with the current bandwidth usage to determine the available bandwidth that exists at any moment.

It will be appreciated that the visual/audio content/assets to be cached are streamed to the client device in advance of their application and rendering by the client device. During periods of relatively low bandwidth utilization, the unused bandwidth can be utilized to stream the visual/audio assets to the client device. The specific visual/audio assets which have been stored at the client device can be tracked, and the game engine can therefore be configured to exclude those visual/audio assets (which are already cached at the client) from being included in the raw image frame data or audio data generated by the game engine.

The mixed data stream 354 is received at the client device 100 and processed by a data stream handler 328. In some implementations, the data stream handler 328 performs a demultiplexing function on the mixed data stream 354 to parse the compressed video, compressed audio, and visual/audio asset streams from the mixed data stream. When visual/audio assets are transmitted in the mixed data stream 354, then the cache manager 330 stores the visual/audio assets to a client cache storage 318, and more specifically as visual content data 322 and/or audio content data 324 which define part of the cache data 320 for the video game.

The data stream handler 328 also produces (e.g. demultiplexes and/or decompresses) video and audio streams from the mixed data stream 354. The video and audio streams are passed to an image stream assembler 326 or an audio stream assembler 334, respectively. The image stream assembler 326 is configured to determine which portions of image frame data have been excluded in the video stream, and fill in these portions with visual content/assets retrieved from the client cache data 320. In some implementations, the aforementioned visual asset identifier is transmitted along with or as part of the mixed data stream, and is processed to identify the visual assets that are to be inserted/combined into the video stream and the parameters regarding their placement and possibly other visual properties. In some implementations, a marker is encoded in the video stream itself, the marker identifying the visual asset to be added and its location within the video stream, both spatial and temporal.

The image stream assembler 326 outputs the fully assembled video stream to a video signal generator 332. The video signal generator 332 processes the fully assembled video stream to generate the appropriate video signal in the correct format for rendering by the display device 152. Though the display device 152 is shown as a separate component in the illustrated system, in some implementations, the display device 152 is incorporated as part of the client device 100.

In a similar manner to the image stream assembler 326, the audio stream assembler 334 is configured to determine which portions of audio data have been excluded in the audio stream, and fill in these portions with audio content/assets retrieved from the client cache data 320. In some implementations, the aforementioned audio asset identifier is transmitted along with or as part of the mixed data stream, and is processed to identify the audio assets that are to be inserted/combined into the audio stream and the parameters regarding their placement and possibly other audio properties. In some implementations, a marker is encoded in the audio stream itself, the marker identifying the audio asset to be added and its location within the audio stream.

The audio stream assembler 334 outputs the fully assembled audio stream to an audio signal generator 336. The audio signal generator 336 processes the fully assembled audio stream to generate the appropriate audio signal in the correct format for rendering by the audio device 340. Though the audio device 340 is shown as a separate component in the illustrated system, in some implementations, the audio device 340 is incorporated as part of the client device 100. Furthermore, in some implementations, the audio device 340 is included as part of the display device 152.

Figure 4:
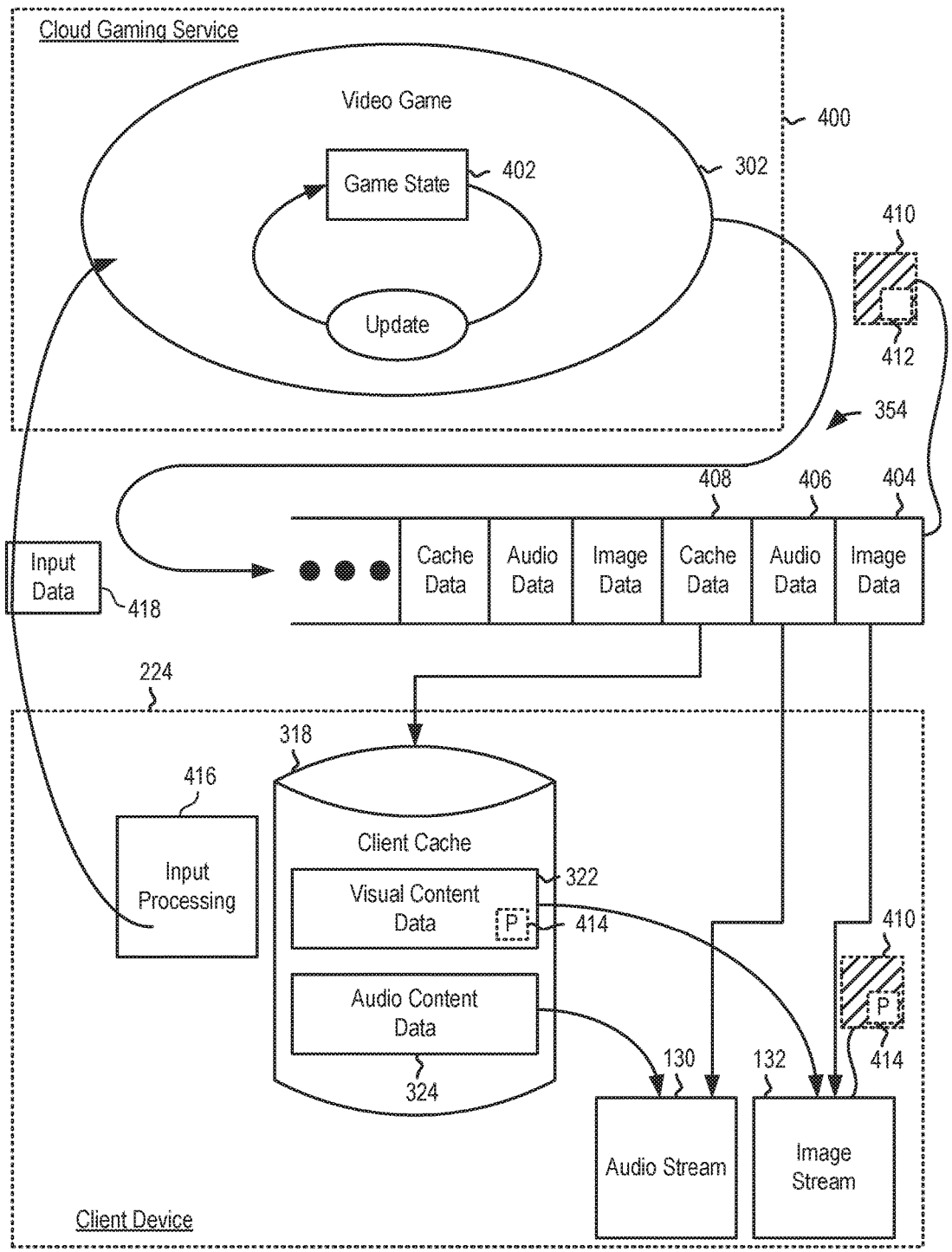
FIG. 4 conceptually illustrates the flow of data to provide for local cache-optimized cloud video game streaming from a cloud gaming service, in accordance with implementations of the disclosure.

FIG. 4 conceptually illustrates the flow of data to provide for local cache-optimized cloud video game streaming from a cloud gaming service 400, in accordance with implementations of the disclosure. The executing video game 302 is shown, which defines a game state 402 that defines the moment-to-moment state of variables for the video game. It will be appreciated that executing video game 302 continually updates the game state 402, based on the current state and based on input data 418 received from the client device 100.

The video game 302, as processed through the cloud gaming service 400, produces a mixed data stream 354. The mixed data stream 354 includes image data 404, audio data 406, and cache data 408. In the illustrated implementation, the image data 404 defines an exemplary image frame 410. A portion 412 of the image frame 410 is not fully defined, that is, the portion 412 is to be supplied by the client device 100, rather than being fully defined/included in the image frame 410, so as to reduce the amount of bandwidth required for streaming the image frame.

Cache data 408 includes data defining assets which are to be inserted into image frames of the image data 404, such as image frame 410. The cache data 408 is received by the client device 100, parsed from the mixed data stream 354, and stored to a client cache storage 318, as part of visual content data 322. In the illustrated implementation, a visual asset 414, which was previously transmitted to the client device 100, is retrieved from the image cache data 322, and inserted into the image frame 410 to define the portion 412 that was previously not fully defined. The resulting completed image frame forms part of the complete image stream 132 for presentation on a display device.

It will be appreciated that visual assets which are transmitted to and cached at the client device can be any type of image, item, object, or other visual property that may be separately provided apart from the video stream generated by the cloud video game, and later inserted into image frames of the video stream at the client device to provide completed image frames for rendering to a display. The visual assets can include static items which are static in the sense that their appearance, when presented in the video stream, is not subject to alteration based on the current game state. These may include, for example, items such as indicators, emblems, trophies, badges, and other types of visual items whose appearance is not dynamically determined based on the current game state. For example, there may be various visual indicators that indicate to the user a current status of a character or of the gameplay, such as powers, items possessed, other users' characters, etc. As another example, a video game in which the user assumes the role of piloting a vehicle may include a view of a cockpit of the vehicle. Some of the visual items in the cockpit may be static, and may not change while the cockpit is being shown in the user's game view, even as the interactive gameplay of the video game proceeds. Static visual assets can be inserted into the video stream at the client device without alteration.

However, it will be appreciated that in some implementations, the visual assets can include dynamic visual assets whose appearance is, at least in part, determined based on game state conditions. For example, dynamic visual assets may be altered in color, size, orientation, transparency, or any other visual property, by the client device based on the current game state, and inserted into the video stream by the client device prior to rendering to the display. To accomplish this, alteration data can be transmitted with the video stream to indicate the specific alterations which are to be performed on the visual asset prior to insertion in the video stream.

In a similar manner to the above discussion, audio data 406 delivered in the mixed data stream 354 can be supplemented with an audio asset from audio cache data 324 to define a completed audio stream 130 for presentation through an audio device. The audio assets can include any of various types of audio or sounds which are utilized by the video game, including without limitation, sound effects, background music, prerecorded audio clips, etc. It will be appreciated that the particular audio which is generated/ inserted at the client device versus that which is generated by the cloud gaming machine may vary in different implementations. For example, in some implementations, background music/audio is generated and added to the audio stream at the client device, while other sound effects that are triggered or activated by the user's real-time interactive gameplay are generated by the cloud gaming machine. In one particular implementation, all sound is generated at the client device, based on data generated by the cloud gaming machine and received by the client device in the mixed data stream that identifies the sounds to be produced, the timing of such sounds, and any additional audio-related parameters, e.g. volume, equalization, directionality/origin, etc.

Visual and audio assets can be predictively or preemptively transmitted to the client device, based on the current game state which may be indicative of an expected future game state. This can be useful for mitigating the abrupt increases in bandwidth utilization that may occur at scene changes, when for example, the entire view of the video game scene may change. For example, if a player-controlled character is in a vicinity of or moving towards a physical or temporal location where a scene change may occur, then visual/audio assets may be transmitted to the client device to be utilized at the scene change. For example, if a player directs his character towards a door, and opening or passing through the door results in a scene change, then prior to the opening of the door, visual/audio assets may be transmitted to the client in anticipation of being utilized during the scene change. In another example, when the user is nearing completion of a level or scene of the video game, then visual/audio assets may be transmitted to the client device prior to the completion of the level/scene, for use during the streaming of the next level/scene. In some implementations, when the user's gameplay completion of a scene/level passes a predefined threshold, then visual/audio assets are transmitted to the client device as available bandwidth allows.

An input processing module 416 at the client device 100 is configured to process input from a controller device or other input device, and transmit input data 418 to the executing video game 302. The video game 302 applies the input data 418 to update its game state 402. It will be appreciated that based on this game state, a predicted future game state can be determined, and the transmission of visual/audio assets to the client device can be determined based on the predicted future game state.

Figure 5:
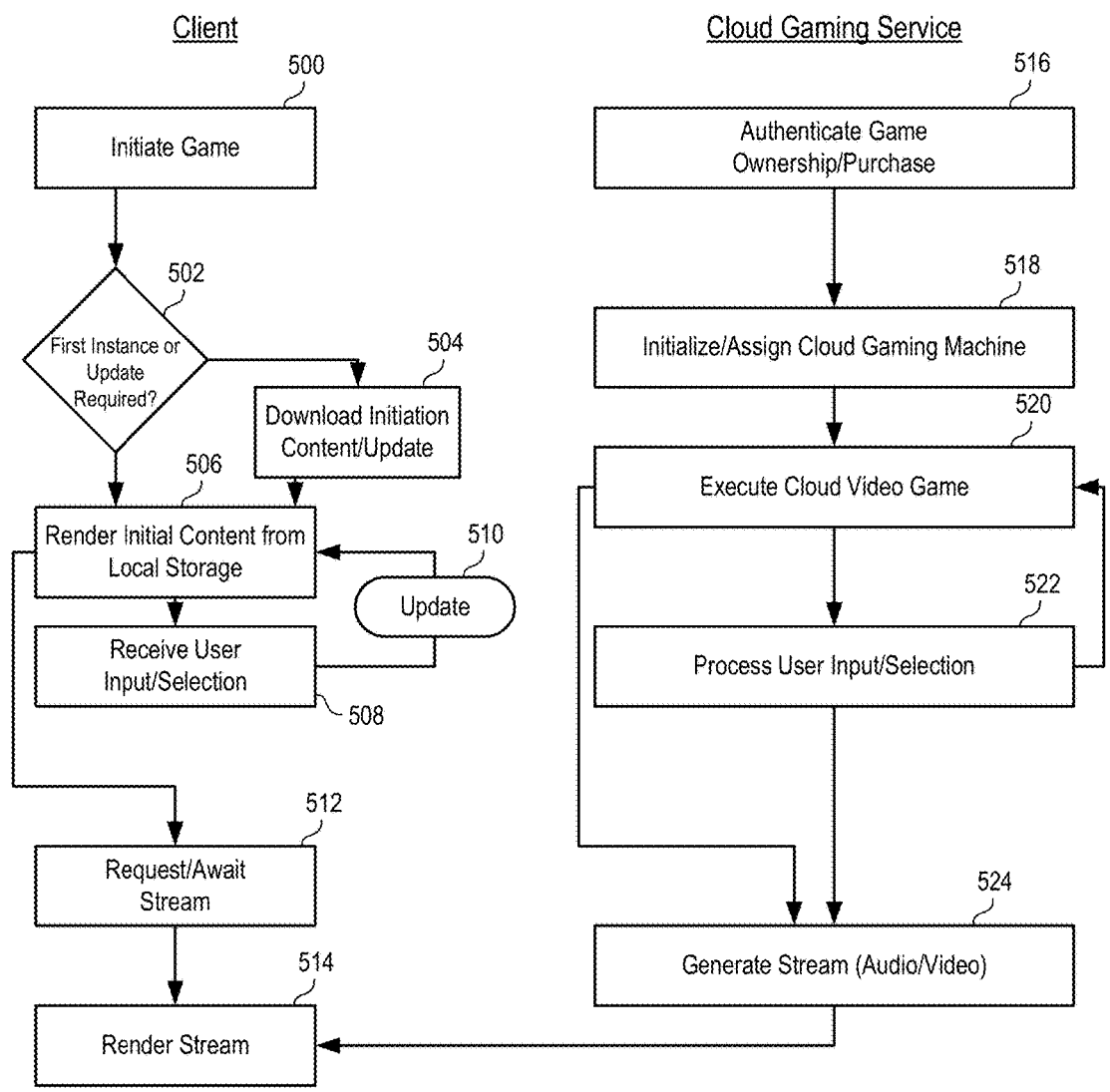
FIG. 5 illustrates a method for providing local application quick start functionality, in accordance with implementations of the disclosure.

FIG. 5 illustrates a method for providing local application quick start functionality, in accordance with an embodiment of the disclosure. At method operation 500, a request to initiate a video game is received at a client device that is in communication with a cloud gaming service. At method operation 502, it is determined whether this is the first instance of requesting the game, such as an initial purchase of the game, or if an update is required. If so, then at method operation 504, initial content for the video game is downloaded and installed and/or updated. If no update or additional download is required, or following such download and installation/update, then at method operation 506, the initial content of the video game is rendered from the client device's local storage. At method operation 508, user input and/or selection in response to the rendered initial content is processed at the client device, and at method operation 510, the state of rendering of the initial content is updated, thus returning to method operation 506.

Meanwhile, the request to access the video game is communicated to the cloud gaming service, which authenticates the user's game ownership and/or purchase of the requested video game. At method operation 518, a cloud gaming machine is initialized to execute the requested video game and assigned to the user's cloud gaming session. At method operation 520, the cloud gaming machine executes the video game. At method operation 522, user input/selection is processed by the executing video game to update the state of the executing video game. The input/selection can be defined from user interaction with the initial content.

At method operation 512, the client device requests and/or awaits for streaming of the video game to begin. At method operation 524, the cloud gaming service generates and transmits the streaming video/audio of the video game, and at method operation 514, the streaming video/audio is received by the client device and rendered for user interactivity.

Figure 6:
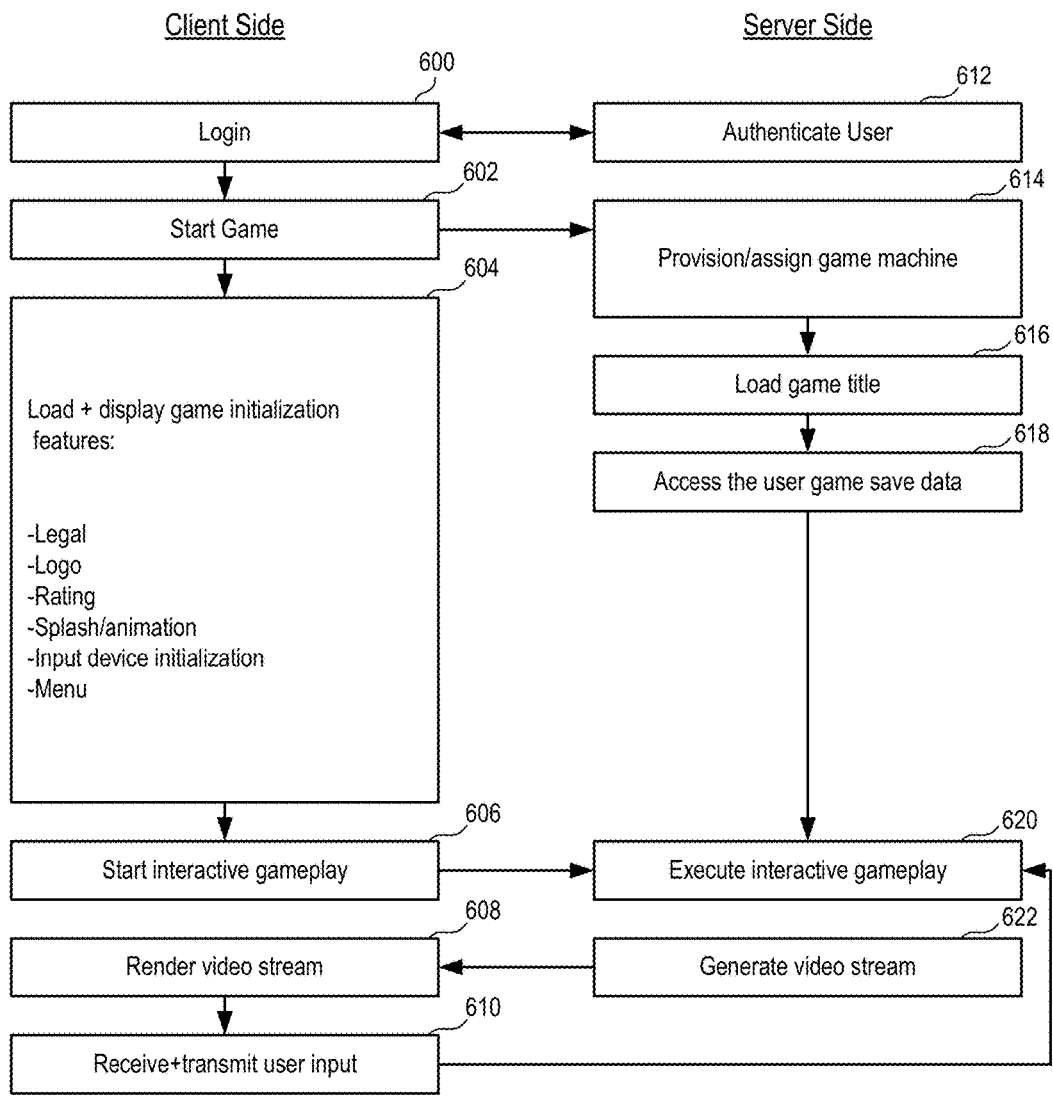
FIG. 6 illustrates a method for providing local application quick start functionality in accordance with implementations of the disclosure.

FIG. 6 illustrates a method for providing local application quick start functionality in accordance with an embodiment of the disclosure. At method operation 600, the user logs in to the cloud gaming service via a client device, which effects authentication of the user by a cloud gaming server at method operation 612. At method operation 602, the user starts a video game at the client device, and in response, at method operation 604, initial content of the video game is loaded from a local storage of the client device and rendered to a display.

Meanwhile, at method operation 614, in response to the user request to start the video game, a game machine is provisioned/assigned to the user's client device. At method operation 616, the game machine is loaded with the requested video game title. At method operation 618, either anticipatorily or in response to a user request, saved game data from the user's account is accessed and loaded.

At method operation 606, a request is received from the user of the client device to start interactive gameplay. At method operation 620, interactive gameplay is executed by the cloud game machine. At method operation 622, the cloud gaming service generates a video stream that is transmitted to the client device. At method operation 608, the video stream is rendered by the client device. At method operation 610, interactive input is received by the client device and transmitted to the executing video game at the cloud game machine. The executing video game processes the interactive input to update its game state, and based on the updated game state, the video stream is generated as indicated at reference 622.

Figure 7:
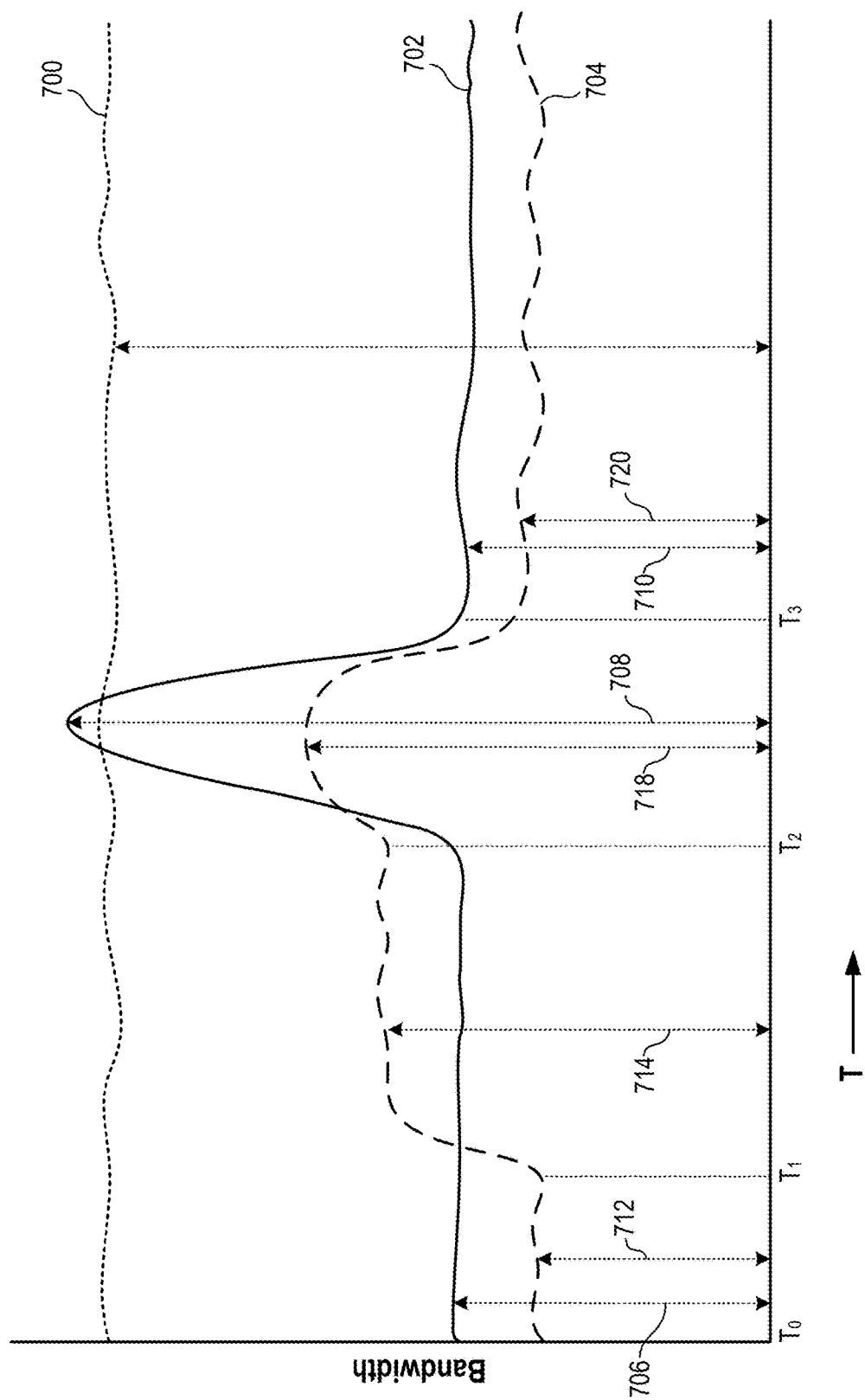
FIG. 7 is a graph depicting data bandwidth versus time, comparing bandwidth utilization for an existing conventional game streaming setup to one that employs a client cache, in accordance with implementations of the disclosure.

FIG. 7 is a graph depicting data bandwidth versus time, comparing bandwidth utilization for an existing conventional game streaming setup to one that employs a client cache, in accordance with implementations of the disclosure. The curve 700 illustrates the maximum available data bandwidth for game streaming. The curve 702 illustrates bandwidth utilization for an existing conventional game streaming setup. The curve 704 illustrates bandwidth utilization for a game streaming setup incorporating client cacheable content, as described elsewhere herein. At time $T_0$ the bandwidth utilization level 706 shown for curve 702 is within the available bandwidth, and so no degradation in streaming quality will be experienced by the user. However, at time $T_2$, a scene transition or other event occurs which causes the bandwidth utilization to dramatically increase. The bandwidth utilization rises to a peak level 708 that exceeds the maximum available bandwidth 700, thereby possibly resulting in degradation of the video/audio streaming quality. At time $T_3$, the bandwidth utilization returns to a level 710 that is within the maximum available bandwidth.

The curve 704 illustrates bandwidth utilization for a cloud gaming setup employing client caching in accordance with implementations of the disclosure. At time $T_0$ to time $T_1$, the bandwidth utilization is at a level 712, which may be somewhat below the corresponding level 706 of the conventional setup, due to the use of cacheable content at the client to provide portions of the video/audio streams. At time T1, it is determined that the user's gameplay is nearing a scene transition or other event that will require greater bandwidth utilization. Therefore, cacheable content to be used for the scene transition is streamed to the client device prior to the occurrence of the scene transition, resulting in an increase in bandwidth utilization to a level 714. It will be appreciated that the level 714 is above the level 716 of bandwidth utilization for the conventional system, but still within the available bandwidth 700.

At time T2, the scene transition occurs, and the bandwidth utilization may rise to a level 718, yet unlike the conventional system, the level 718 for the system employing client caching is still within the available bandwidth 700 so that no degradation in streaming quality occurs. At time T3, the scene transition is complete and the bandwidth utilization drops to a level 720, which may be lower than then level 710 due to the continued application of client cached content to provide portions of the video/audio streams.

When a user plays a given video game, save data is generated that is associated with the video game. The user's save data for the video game can include data which describes, and can be used to reconstruct, the game state of the video game at various points during the user's gameplay, or any other data specific to the user that is associated with the video game. For example, the user's game save data may include data defining objects (e.g. characters, items, vehicles, weapons, or any other objects), status or characteristics of objects, positions (including locations and orientations) and/or movements of objects, resources, abilities, amounts/levels of completion, etc. The user's save data can also include other types of game-related data that may vary from one player to another, such as game-specific user profile information, achievements, trophies, awards, game preferences, activity logs, chat logs, etc. It will be appreciated that the granularity of the user's save data for a given video game can vary, for example, in terms of how often the game is saved and how much of the available game state information is saved. The video game may have an autosave feature (which may be adjustable according to user setting) that automatically saves the game at periodic intervals based on factors such as progress, completion of game tasks/levels/sections, elapsed time, user settings, etc. Furthermore, the user may choose to save the game at various time points, various geographic/spatial locations, various amounts of completion, etc. during gameplay, to allow him/her to return to the same (or approximately the same) place in the gameplay if so desired.

When the video game is hosted in the cloud as in accordance with implementations of the present disclosure, it will be appreciated that the user save data is stored at a data center from which the video game was last streamed. As the video game was last executed by a game machine at the data center, so the user save data generated from the execution of the video game by the game machine can be stored at the data center after completion of the gameplay session. However, a subsequent session of the cloud video game may be streamed from a different data center, and hence the user save data for the cloud video game will need to be migrated to the new data center to fully enable all options for the particular player related to the specific cloud video game. The user save data can be quite extensive and migration of the user save data from one data center to another data center causes undesirable delays to the initiation of gameplay for the user. Thus, in accordance with implementations of the present disclosure, methods and systems are provided to permit the user to initiate gameplay without having migrated some or all of the user's save data for the cloud video game. Furthermore, the user's save data can be integrated into the ongoing cloud video game execution at a subsequent time during gameplay.

FIG. 8A conceptually illustrates a method for providing gameplay of a cloud video game without loading the video game save data for a given user prior to initiating gameplay of the cloud video game, in accordance with implementations of the disclosure. At method operation 800, a game machine is loaded with the cloud video game. The game machine is configured to execute the cloud video game to generate video content that will be streamed to the user's client device, and further configured to process input received from the client device to drive the execution of the cloud video game. To minimize the time required to initiate gameplay, the user's save data for the video game is not loaded on the game machine. Rather, the cloud video game is loaded on the game machine with generic save data that defines parameters sufficient to initiate gameplay of the cloud video game. It should be appreciated that the generic save data is not associated with any specific user of the cloud gaming system, but may effectively define parameters for a generic or default user. The generic save data is utilized so that gameplay may be initiated more quickly without having to perform location and migration of the user's save data for the cloud video game.

Gameplay of the cloud video game using the generic save data is thus initiated without the time delay that would be incurred if loading and/or migration of the user's save data for the video game was required. Thus, the time period required from when the user initially requests to initiate interactive gameplay, to when the interactive gameplay may start, is reduced as compared to existing cloud gaming setups. Furthermore, in some implementations, the game machine may be pre-loaded with the video game configured with the generic save data. This can provide for a practically instant start to gameplay of the cloud video game, with minimal wait time for the user between requesting initiation of gameplay and commencement of the gameplay.

In some implementations, to facilitate resumption of gameplay from a user's last known location in the video game (e.g. a temporal, spatial, or progress location), data identifying the user's last known location in the video game is retrieved. In some implementations, such data is stored by the cloud gaming system as part of the user's account, or stored/cached at the client device, so as to be readily available upon loading of the cloud video game. It will be appreciated that a combination of the above concepts can yield a setup wherein the user may quickly initiate/resume gameplay of the cloud video game from the user's last known location, with the game machine being loaded with generic user data. That is, the user may initiate gameplay from the user's last known location in the video game but the game execution is applying generic save data to facilitate the gameplay instead of the user's save data for the video game.

In some implementations, the above concept can be extended to include the provision of certain basic game save data in addition to the user's last gameplay progress location. This may include any of the aforementioned gameplay parameters, but in limited form as compared to the full user save data. For example, the user's last known amount of a given resource parameter may be provided (e.g. energy/health, ammunition, etc.). Such data may also be stored to the user's account or stored at the client device. In some implementations, the user's last gameplay progress location and/or basic game save data is retrieved from the data center at which the video game was last executed, without retrieving the full amount of the user save data, to enable the user to initiate gameplay from their last location but without waiting for the transfer of the full amount of user save data.

In some implementations, the user may resume gameplay from their last known location in the video game. In other implementations, the user may resume gameplay from a location prior to their last known location, so as to ease the user's transition when initiating gameplay in the middle of the video game storyline/activity. In some implementations, gameplay is resumed from a break point in the video game occurring prior to the user's last location. It will be appreciated that in some implementations, the prior break point may be the last saved location, whereas in other implementations, the prior break point is chosen based on the user's last location. The prior break point may have generic save data associated with it, which can be loaded to enable quick initiation of gameplay, without transfer of the user's save data as noted above.

It will be appreciated that when a typical video game is first played by a user from the very beginning, a new user setup is configured or provided for the user, such that the user initiates gameplay at the beginning stage of the video game with certain predefined parameters. These predefined parameters may be default parameters that are provided or selected by the system, or may be selected by the user through an initial setup interface. However, to initiate gameplay from a progress location in the middle of the video game typically requires identification of game save data for an existing user, as a user would not normally be able to access a progress location in the middle of the video game without first having completed prior stages of the video game to reach the progress location. It will be appreciated that a progress location can be a temporal location, spatial location, storyline location, or other type of location defined by the video game, to which a player can progress through gameplay of the video game.

Thus, implementations of the present disclosure differ from existing video game systems in that a user may initiate gameplay from a progress location in the middle of the video game without requiring loading of the user's game save data for the execution of the video game. This reduces the wait time for the user prior to initiation of gameplay that would otherwise be required when requesting to initiate gameplay from a middle progress location in the video game. As discussed further below, gameplay is initiated without loading of the user's save data, and the user's save data is integrated with the gameplay at a subsequent time.

Substantially simultaneous with the loading of the cloud video game with the generic save data and/or the subsequent execution and gameplay of the cloud video game, at method operation 802, the user is identified and the user's save data for the cloud video game is identified. The user's save data for the cloud video game may be located in a remote data center and transferred to the data center of the game machine that is currently executing the cloud video game for the user's gameplay session (which was initiated with generic save data). Some or all of the user's save data for the cloud video game may be loaded to the game machine to be integrated with the user's ongoing gameplay session.

At method operation 804, the user save data is linked or integrated with the user's gameplay session of the cloud video game. That is, in some implementations, the save data of the user is applied to the ongoing gameplay session to update the generic save data. This provides for the user their parameters for the cloud video game from their previous session (which may have been streamed from a different data center). The integration can also combine with their progress made in the current session which was originally instantiated with the generic save data. By way of example, certain additive parameters may be summed together to yield a fully updated parameter based on the current gameplay session.

It will be appreciated that in some implementations, the integration of the user save data can be performed after transfer of the user save data is complete. Whereas in other implementations, the integration of the user save data can be performed even as the user save data is being transferred. For example, portions (or a specific parameter) of the user save data can be transferred and immediately integrated into the current gameplay session once a given portion (or parameter) has been transferred.

The linking or integration of the user save data into the current session of the cloud video game might be perceived by some users as being unusual or strange. Therefore, in some implementations, to reduce drawing attention to the linking or integration of the user save data is configured to occur at a natural breakpoint in the progression of the video game (e.g. at a pause in the gameplay, at a transition from one stage or level to another in the video game, following completion of a task, following achievement of a gameplay milestone, etc.) After the game machine has been loaded with the user save data to update the generic save data, the gameplay continues and the parameters for the video game, and the user's save data are updated.

After completion of gameplay of the cloud video game, then at operation 806, the user is detached from the game machine. That is, the user is no longer associated to the game machine that executed the session of the cloud video game. The user's save data for the cloud video game is saved at the data center, and the user's profile/account information and/or the user's client device may be updated to identify the location of the user's save data for the cloud video game at the data center. The game machine is available for video game execution to enable another streaming video game session to another user or the same user. In some implementations, detachment of the user causes the video game to revert to a state of being loaded with the generic save data, so as to be available and ready for instant gameplay when another user requests to initiate gameplay of the cloud video game and is assigned to the game machine.

Figure 8B:
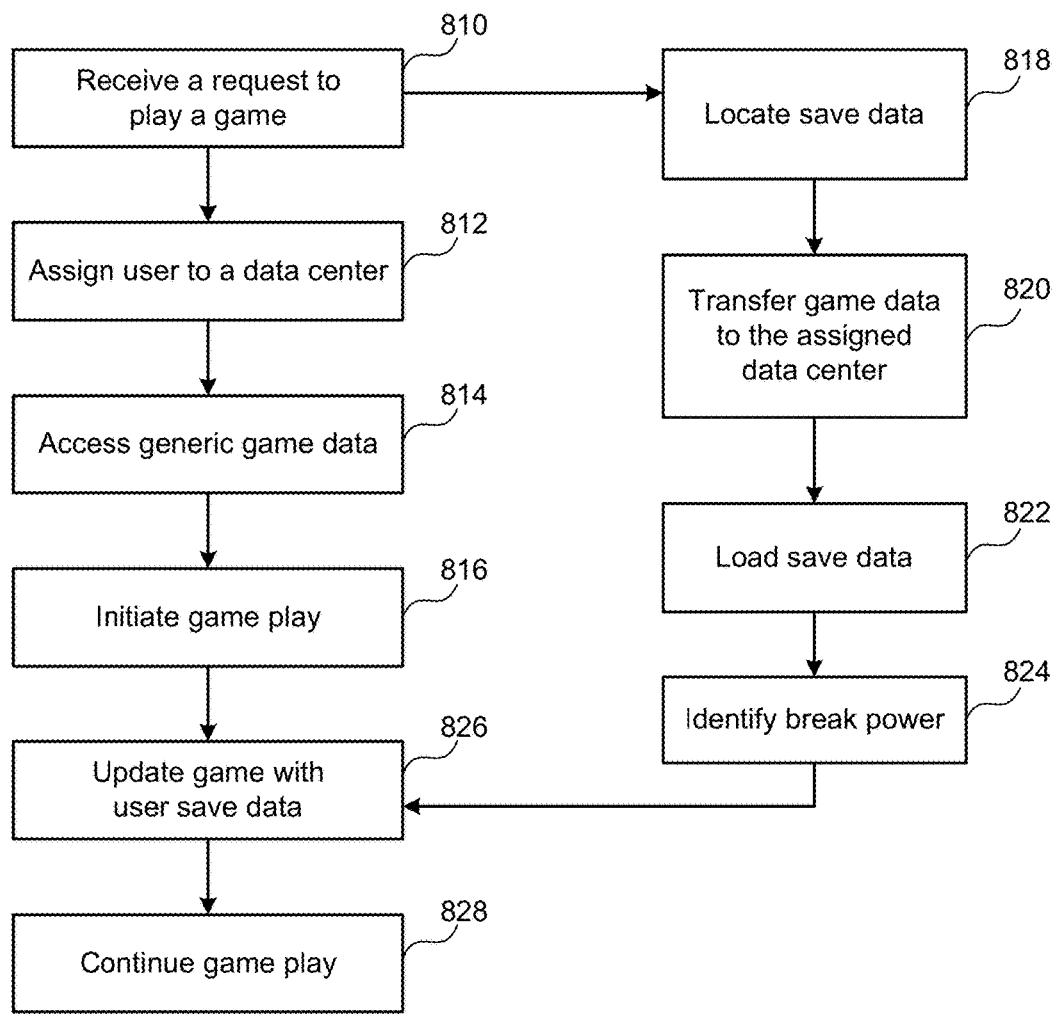
FIG. 8B illustrates a method for managing game initiation and transfer of user save data, in accordance with implementations of the disclosure.

FIG. 8B illustrates a method for managing game initiation and transfer of user save data, in accordance with implementations of the disclosure. At method operation 810, a request to play a video game is received. At method operation 812, in response to the request, the user is assigned to a data center from which to stream the video game. At method operation 814, the generic game data is accessed/loaded with the video game. At method operation 816, gameplay of the video game initiates with the generic game data. Also in response to the request to play the video game, at method operation 818, the user save data for the video game is located at a second data center. At method operation 820, the user save data is transferred from the second data center to the assigned data center from which the user streams the video game. At method operation 822, the user save data is loaded to the game machine that executes the video game at the assigned data center. At method operation 824, a break point in the gameplay of the video game is determined. And when the break point is reached, then at method operation 826, the execution of the video game is updated with the user save data. At method operation 828, the interactive gameplay of the video game continues.

Figure 9:
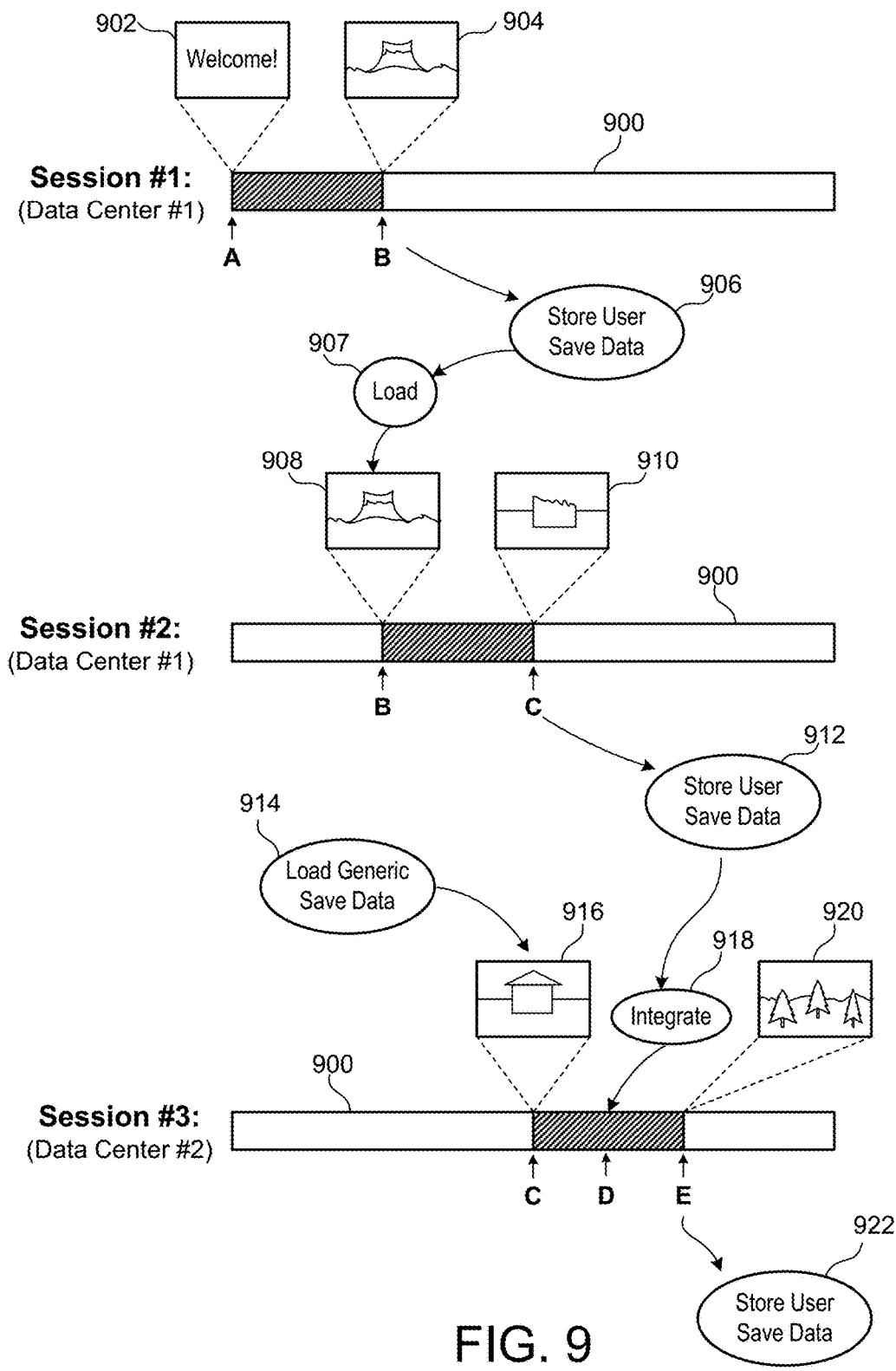
FIG. 9 conceptually illustrates a series of gameplay sessions of a cloud video game, in accordance with implementations of the disclosure.

FIG. 9 conceptually illustrates a series of gameplay sessions of a cloud video game, in accordance with implementations of the disclosure. In the illustrated implementation, a gameplay progress bar 900 graphically illustrates a user's gameplay progress within the context of the cloud video game. Horizontal positioning along the gameplay progress bar 900 indicates a progress location within a context of the video game (e.g. a temporal context or spatial context, or other type of context according to which a user's gameplay progress in the video game may be measured/quantified). Shaded portions of the gameplay progress bar 900 between two locations indicates an amount of gameplay progress and further defines progress from one progress location to another within the video game.

During a gameplay session #1, for which the cloud video game is executed at a data center #1, the user initiates gameplay of the cloud video game from the beginning, starting at a progress location A and ending the session at a progress location B. At progress location A, a scene 902 is shown to the user (e.g. generated through the execution of the video game and streamed to the user's client device from the data center #1). When the user's gameplay reaches location B, the scene 904 is shown to the user. During gameplay session #1, the user's gameplay progressed from location A to location B, and after ceasing gameplay, the user's save data is stored at the data center #1, as indicated by reference 906.

At a subsequent time, a gameplay session #2 of the cloud video game is initiated by the user. The user's gameplay session #2 is assigned to the same data center #1 from which the gameplay session #1 was instantiated. Thus, as the user's save data for the video game is already located at the data center #1, it is readily loaded for the gameplay session #2, as indicated at reference 907, including all available parameters utilized to resume gameplay of the video game from location B. Thus, during the session #2, the user is able to resume gameplay from progress location B where the user previously ended the prior session #1, and the scene 908 shown at the beginning of the gameplay for session #2 matches the scene 904 shown at the end of session #1. It will be appreciated that in implementations of the disclosure, the cloud gaming system may be configured to determine if the user's save data for the video game is stored at the same data center at which the current session of the video game is, or will be, instantiated (or whether the user's most recent previous gameplay session of the video game was streamed from the same data center), and if so, then the user's save data for the video game is loaded prior to initiating interactive gameplay. Whereas if such is not the case, then the user's save data for the video game is not loaded prior to initiating interactive gameplay, so as to reduce delay as has been noted.

During session #2 of the video game, the user's gameplay advances from progress location B to progress location C, at which point the gameplay session #2 is ended. Following the conclusion of gameplay for session #2, the user's save data is stored at data center #1, as indicated by reference 912.

Subsequently, a gameplay session #3 of the cloud video game is instantiated at a different data center #2. Because the user's save data is not stored at data center #2, then to avoid undue delay for the user to initiate gameplay (resulting from, e.g. retrieval and migration of the user save data over networks), the cloud video game is loaded with generic save data, as indicated by reference 914. Because session #3 of the video game is not loaded with the user's save data, certain aspects of the gameplay may not match the user's prior configuration. For example, the scene 916 presented at progress location C for session #3 may not completely match the scene 910 presented at progress location C for session #2. Merely by way of example without limitation, in the illustrated implementation, a building that was damaged in the scene 910 is shown in an undamaged state in the scene 916. This is because when instantiated with the generated save data, the building is in an undamaged state, whereas if loaded with the user save data, then the building would be shown in a damaged state. It should be appreciated that similar concepts may extend to any properties or attributes of objects in a virtual scene presented during gameplay of the video game. In the absence of the user save data for the video game, objects may have default values that do not match those of the user save data, and may therefore be presented in a manner that differs from that which would occur had the user save data been applied. However, the user is able to instantly initiate gameplay without waiting for migration and loading of the user's save data for the cloud video game.

Substantially simultaneous with the instantiation and gameplay of the video game during session #3, the user's save data for the cloud video game is located and retrieved, including migration from data center #1 to data center #2. At a progress location D, the user save data is integrated with the gameplay session #3, as indicated by reference 918. This can entail a process for reconciling the user save data with the gameplay that has occurred during the session #3 to that point (progress location D). For example, the properties and attributes of objects for the gameplay session #3 may be updated in accordance with the user's save data. Furthermore, the user's save data may also be updated in accordance with the gameplay that has occurred. The user's save data may be stored/updated at the conclusion of gameplay at progress location E, as indicated by reference 922. A scene 920 is presented when gameplay reaches the progress location E.

Figure 10A:
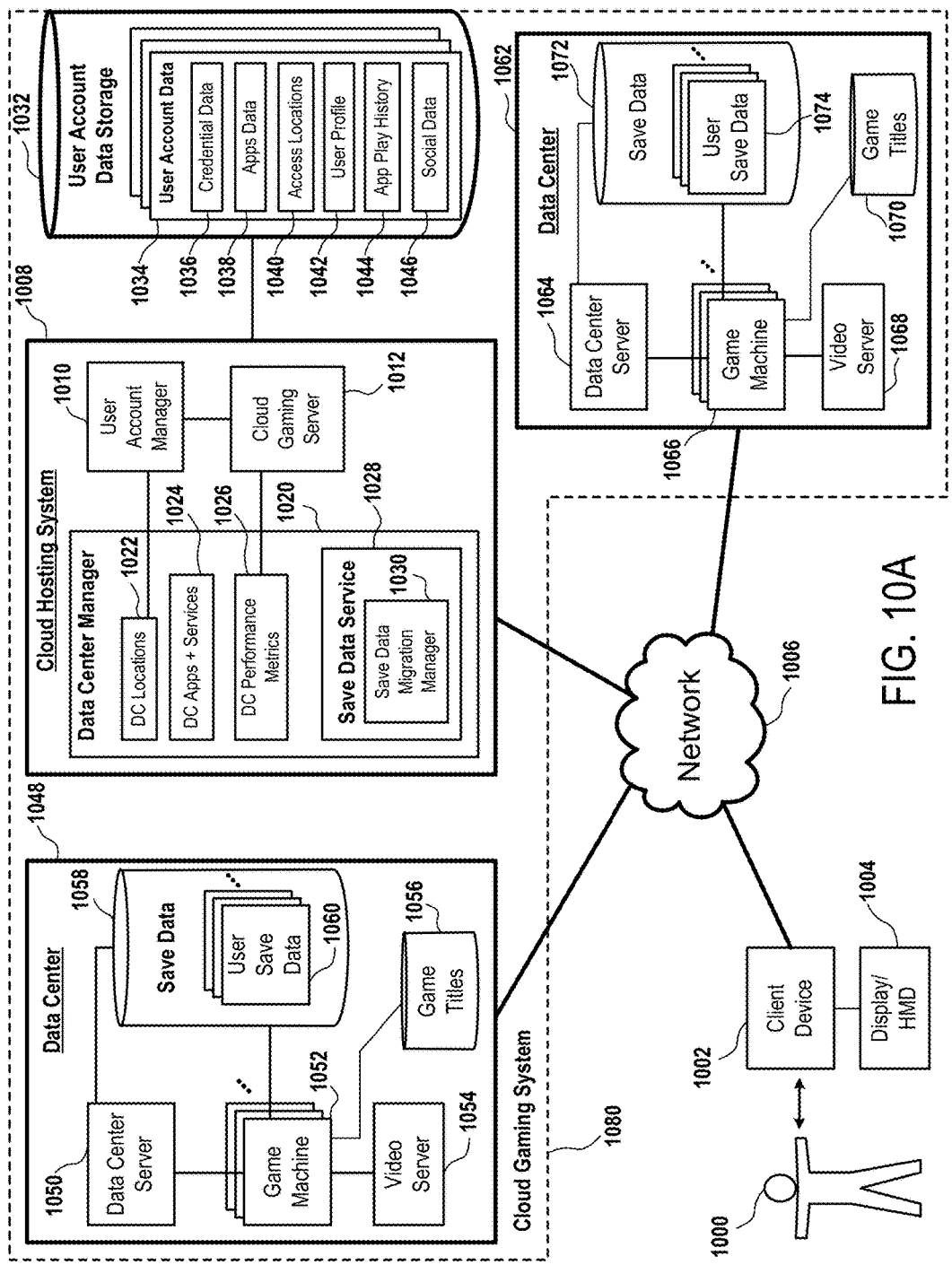
FIG. 10A illustrates a system for providing cloud gaming services, in accordance with implementations of the disclosure.

FIG. 10A illustrates a system for providing cloud gaming services, in accordance with implementations of the disclosure. A cloud gaming system 1080 includes several components that communicate with each other over a network 1006 to provide cloud gaming services to a client device 1002 operated by a user 1000. The cloud gaming system 1080 includes a cloud hosting system 1008 that is configured to manage data and services related to cloud gaming activity by users of the cloud gaming system. The cloud hosting system includes a cloud gaming server 1012 that receives (over the network 1006) and responds to requests from the client device 1002. The cloud gaming server 1012 can, for example, receive a request to initiate gameplay of a cloud video game, and in response, assign the client device 1002 to a data center, such as data center 1048 or data center 1062, to carry out the execution and streaming of the cloud video game.

The cloud hosting system 1008 further includes a user account manager 1010 that is configured to manage user account data 1034 for the user 1000, the user account data 1034 being stored to a user account data storage 1032. The user account data 1034 includes various kinds of data related to the user's account and their cloud gaming service. By way of example, the user account data 1034 may include credential data 1036, application data 1038, access locations data 1040, user profile data 1042, application play history 1044, social data 1046, etc.

The credential data can include data identifying permissions and access rights of the user account that relate to cloud gaming services, e.g. data identifying subscriptions, services, credits, etc. The application data 1038 can include data related to specific applications/games, e.g. data identifying purchased applications/games, configurations or versions of given applications/games associated with the user account, user-specific data related to a given application/game, etc.

The access locations data 1040 can include data identifying locations from which the user 1000 accessed the cloud gaming system 1080, e.g. geographic locations or regions (e.g. coordinates, city, state, country), ip/network address information, etc. The access locations data 1040 may further include data identifying specific data centers from which the user's client device 1002 streamed video games from the cloud gaming system.

The user profile data 1042 includes data identifying characteristics of the user, such as demographic information (e.g. age, gender, residence, income, ethnicity, language, education, etc.), contact information (e.g. e-mail, phone number, etc.), user preferences, user interests, notification/communication preferences, etc. It will be appreciated that in some implementations user interests and preferences can be determined by the system based on the user's activity on the cloud gaming system, e.g. interests could be deduced based on purchased games, gameplay history, watched videos, browsing history, social network activity, etc.

The application play history data 1044 includes data identifying the historical gameplay activity of the user 1000, e.g. games/applications played or accessed, times of gameplay of a given game, durations of gameplay of a given game, total duration of gameplay for a given game, etc. The application play history data 1044 can be correlated with the access locations data 1040 to identify which games were played from which locations by the user 1000.

The social data 1046 can include data identifying a social network of the user 1000, as well as activity on the social network related to the user. The social network can be a gaming-specific social network that is part of the cloud gaming system 1080, or may be third-party social network that is accessible from the cloud gaming system 1080. The social data 1046 can further include data identifying a social graph of the user, including data identifying other users that are members of the social graph of user 1000.

As noted, the user account manager 1010 manages the user account data 1034, which may include updating the user account data 1034 based on the user's gameplay activity. For example, the user account manage 1010 may update the applications data 1038 and/or the application play history 1044 based on gameplay of a given cloud video game by the user 1000.

The cloud hosting system further includes a data center manager 1020 that is configured to manage the assignment of client devices such as client device 1002 to data centers such as data centers 1048 and 1062, which offer video game streaming service. The data center manager 1020 includes data center locations data 1022, which includes data identifying the locations of various data centers (in the illustrated implementation, including data centers 1048 and 1062.

Data center applications and services module 1024 provides data identifying the specific applications/games and services which are available from a given data center. The data can thus identify specific game titles which are available for streaming from a data center, as well as services offered by the given data center. In some implementations, game machines in a data center may be preloaded with certain cloud video games, and the data center applications and services module 1024 may provide data identifying the current status of game machines at a given data center, including game machines which have been preloaded and are available for streaming. Based on such data, the data center manager may assign a given user's client device to a given data center having an available game machine that has been preloaded with the video game that is requested for gameplay by the user.

The data center manager may further include a data center performance metrics module 1026, which can provide data identifying the current and historical performance of data centers (e.g. streaming data rates (downstream/upstream), game machine utilization, round-trip network times from various locations, etc.). The data center performance metrics module 1026 can provide real-time metrics regarding the performance and utilization of a given data center, and may therefore provide data influencing the assignment of a user client device to a given data center. For example, such data may be utilized to provide for load-balancing across data centers, wherein client devices are assigned to data centers based at least in part on the relative loads being currently undertaken by a plurality of data centers.

In the illustrated implementation, a first data center 1048 is shown, including a data center server 1050, game machine (s) 1052, and a video server 1054. By way of example, the first data center 1048 can be the data center #1 described above with reference to FIG. 9. With continued reference to FIG. 10A, it will be appreciated that the game machine 1052 can have any hardware/software configuration to enable execution of a cloud video game thereon. For example, the game machine may be a game console or equivalent hardware, a personal computer, a server computer, a virtual machine configured to provide the appropriate execution environment for the cloud video game, etc. The game machine 1052 is loaded with a cloud video game, the executable code for the cloud video game being retrieved from a game titles storage 1056.

The data center server 1050 receives and responds to requests from the cloud hosting system. For example, the cloud gaming server 1012 may send a request to the data center server 1050 to initiate gameplay of a cloud video game for the client device 1002. The data center server 1050 may responsively assign the client device 1002 to the game machine 1052, which may load, or be preloaded with, the cloud video game. The data center 1048 includes save data storage 1058, which includes user save data 1060 for the cloud video game. In the presently described scenario, it may be determined that the user save data 1060 for the cloud video game is stored at the data center 1048 from which the gameplay will be streamed, and therefore the game machine 1052 is also loaded with the user save data 1060 for the cloud video game.

It will be appreciated that the determination of whether the user save data for the cloud video game is stored at the data center 1048 can be performed by the game machine or the data center server in some implementations. In some implementations, the location of the user's save data for the cloud video game can be stored as part of the user account data 1034, for example as part of the applications data 1038, and may be retrieved by the user account manager 1010 and passed to the data center server 1050, so that it may be determined whether the load the game machine 1052 with the user save data or with generic save data to facilitate faster initiation of gameplay.

The game machine 1052 executes the cloud video game and generates video content that is transmitted to video server 1054. The video server 1054 encodes and/or encrypts the video content into video data that is streamed over the network 1006 to the client device 1002. The client device 1002 decodes and/or decrypts the video data, and renders the resulting video content on a display device 1004, such as a television or HMD. The client device 1002 receives interactive input from the user 1000 (e.g. via a controller device or HMD, or through image capture and processing) and generates and sends input data to the game machine 1052 over the network 1006. The input data is processed by the game machine 1052 to drive the execution of the cloud video game to define subsequent game states of the cloud video game.

At the conclusion of gameplay of the cloud video game via the data center 1048, the user's save data for the cloud video game is stored/updated as the user save data 1060. The applications data 1038 and the application play history 1044 may also be updated accordingly by the user account manager 1010 based on the recent gameplay session of the cloud video game. For example, the applications data 1038 may be updated to include data identifying the last progress location of the user within the context of the cloud video game, as well as the location of the user's save data (at data center 1048).

A subsequent gameplay session of the cloud video game may be instantiated at another data center 1062. In some implementations, the data center 1062 may be the data center #2 described with reference to FIG. 9. With continued reference to FIG. 10A, the data center 1062 includes similar components to datacenter 1048, including a data center server 1064, game machine(s) 1066, video server 1068, game titles storage 1070, and save data storage 1072. The data center manager 1020 may have assigned the client device 1002 to the data center 1062 based various factors, including current load levels of the data center 1062 and other available data centers such as data center 1048, the available game machines that may be loaded or possibly preloaded with the requested cloud video game, the proximity of the client device to the available data centers, the location of the user save data for the cloud video game, etc.

In the present case, it is determined by the data center manager that the client device 1002 is to be assigned to the data center 1062 to instantiate the session of the cloud video game. The user account manager 1010 may determine from the applications data 1038 that the user's save data for the cloud video game is stored at the data center 1048. The data center manager may therefore instruct the data center server 1064 to effect loading of the game machine 1066 with generic save data, as the user's save data for the cloud video game will first need to be migrated to the data center 1062, which would delay the user from initiating gameplay.

Simultaneous with the loading of the game machine 1066 with generic save data and/or the gameplay of the cloud video game, a save data service 1028 that manages user save data for cloud video games, activates a save data migration manager 1030 to manage transfer of the user save data 1060 to the data center 1062, where it is stored as user save data 1074 in the save data storage 1072. After transfer of the user save data, the user save data can be applied and integrated or reconciled with the gameplay of the cloud video game that has occurred thus far.

In some implementations, the decision of whether to load the game machine with user save data or generic save data is made in part based on an estimated time to completion of the loading of the user save data, which can be determined based on factors such as the amount of the user save data for the cloud video game, the location of the user save data and the location of the data center to which it will be transferred, network conditions, pre-loaded or non-pre-loaded status of the game machine, etc. In some implementations, if the estimated time to completion exceeds a predefined threshold time, then the game machine is not initially loaded with the user save data, but is instead loaded with the generic save data.

In cloud gaming systems in accordance with implementations of the disclosure, a stream test can be performed prior to initiating streaming of video for gameplay of a cloud video game. Typically, upon requesting a cloud video game for interactive gameplay, the user's client device is assigned to a game machine at a data center. The game machine may need to boot up, be loaded with the executable cloud video game, and/or be loaded with the generic or user save data for execution of the cloud video game. Following these activities, the stream test is performed to test the game streaming quality of service for the client device. However, the performance of the stream test causes additional delay prior to initiation of gameplay. Therefore, in accordance with implementations of the disclosure, the stream test can be performed in parallel with the boot-up and initialization of the game machine.

Figure 10B:
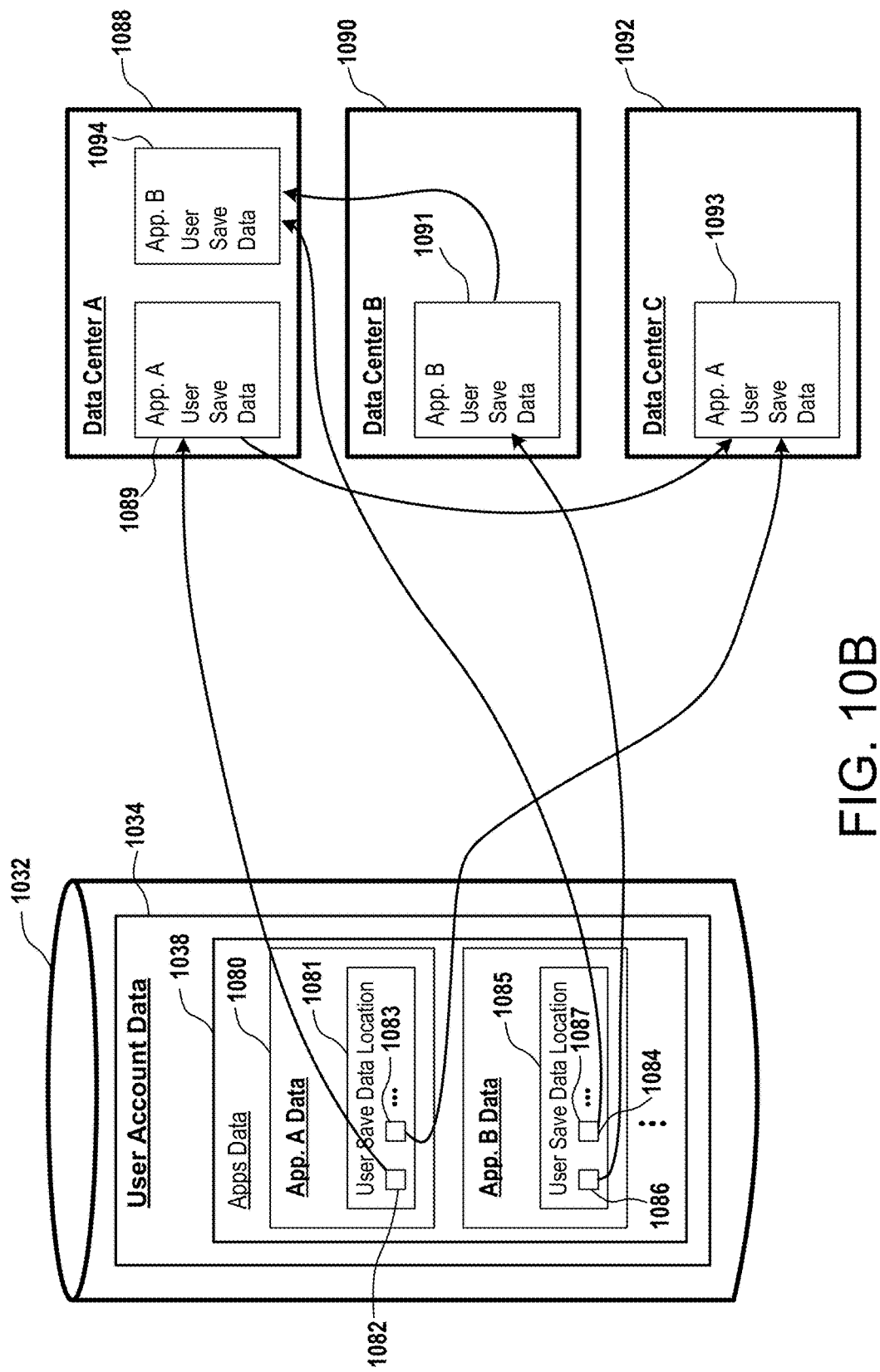
FIG. 10B illustrates the migration of user save data for cloud video games and updating of pointers to the user save data, in accordance with implementations of the disclosure.

FIG. 10B illustrates the migration of user save data for cloud video games and updating of pointers to the user save data, in accordance with implementations of the disclosure. By way of example, the locations of user save data for cloud video games can be stored in association with a user's account. In the illustrated implementation, the aforementioned applications data 1038 is part of user account data 1034 for a given user, and stored to a user account data storage 1032. The applications data 1038 for the user includes application A data 1080 for a first application (or game) A, as well as application B data 1084 for a second application (or game) B. A user save data location 1081 for the application A can define a pointer 1082 that identifies the location of the user save data (e.g. a network address or other identifier of location).

More specifically, in the illustrated implementation, the pointer 1082 identifies the current location of the application A user save data 1089 as being stored at a data center A 1088. Similarly, A user save data location 1085 for the application B can define a pointer 1086 that identifies the current location of the application B user save data 1091 as being stored at a data center B 1090. It will be appreciated that the locations of user save data for different games may be located at different data centers, depending upon the play history of the user and the specific data center locations from which the respective cloud video games were last streamed.

As a user accesses the cloud gaming system from different locations and their gameplay sessions are streamed from different data centers, so their user save data for specific video games will be migrated from one data center to the next. Thus, it is important to track the current location of the user save data for a given video game. For example, with continued reference to FIG. 10B, the user may stream a session of application A from data center C 1092, and thus the user save data 1089 is migrated to the data center C 1092, to define application A user save data 1093. The user save data location 1081 for application A is thus updated to define a new pointer 1083 that identifies the new location of app A user save data 1093 at the data center C 1092. Similarly for application B, the user may stream a session of application B from data center A 1088, and thus the application B user save data 1091 is migrated to the data center A 1088, to define application B user save data 1094. The user save data location 1085 for application B is thus updated to define a new pointer 1087 that identifies the location of app B user save data 1094 at the data center A 1088.

Figure 11:
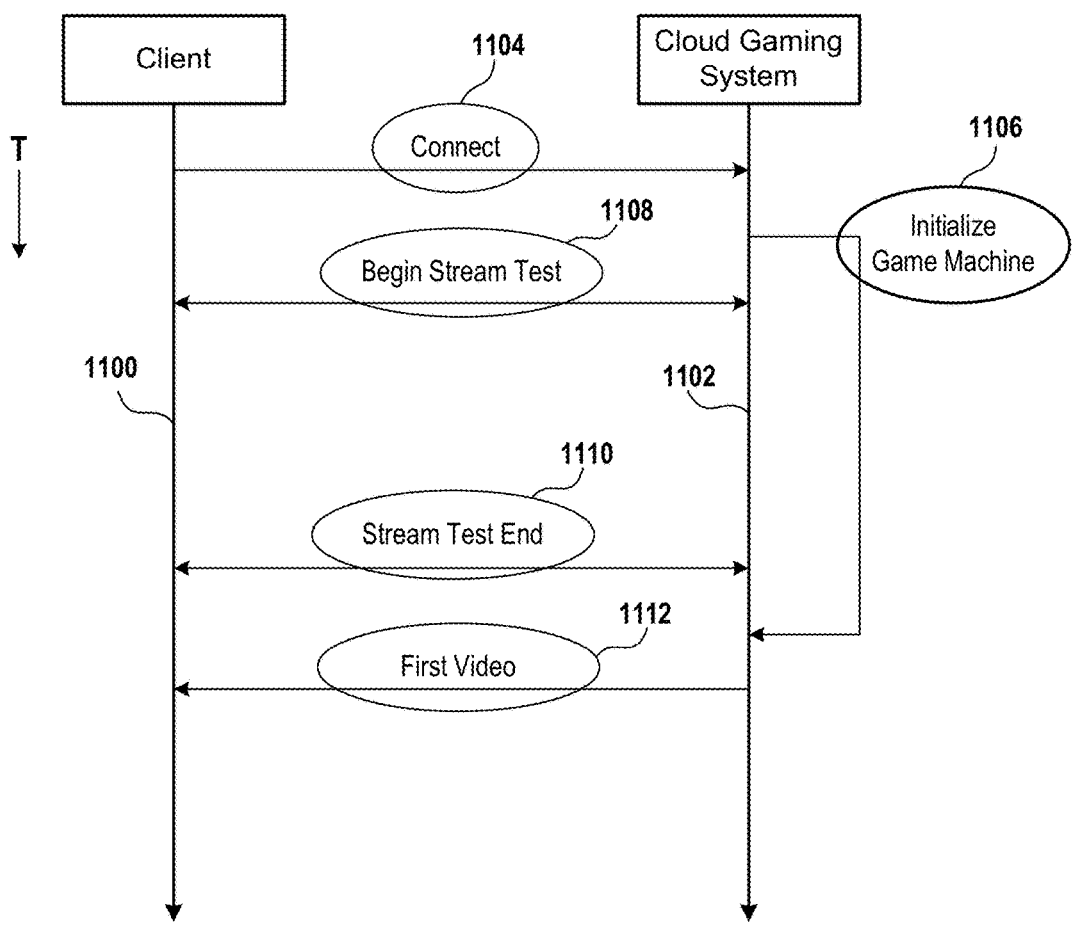
FIG. 11 illustrates a method for performing a stream test simultaneous with boot-up of a game machine for streaming a cloud video game, in accordance with implementations of the disclosure.

FIG. 11 illustrates a method for performing a stream test simultaneous with boot-up of a game machine for streaming a cloud video game, in accordance with implementations of the disclosure. The timeline 1100 indicates events for a client device, whereas the timeline 1102 indicates events for a cloud gaming system, including one or more servers which may communicate with the client device. At method operation 1104, the client device connects to the cloud gaming system and requests to initiate gameplay of a cloud video game. In response to the request, at method operation 1106, a game machine is initialized for execution of the requested cloud video game. That is, the game machine may be booted up, loaded with executable code for the cloud video game, and configured for an interactive gameplay session with a user, which may include loading of user save data or generic save data for the gameplay session. In some implementations, the game machine is a console that is booted in response to the request to initiate gameplay of the cloud video game.

Substantially simultaneous with the initialization of the game machine, at method operation 1108, a stream test is initiated between the client device and a server of the cloud gaming system. The stream test is configured to test the quality of service for video streamed to the user's client device and data transmitted from the client device to the cloud gaming system. The stream test can include testing of network performance metrics that may indicate the game streaming quality of service, including without limitation, maximum downstream/upstream data rates (or downstream/upstream bandwidth), round-trip times, latency, dropped packet rates, error rates, etc. The stream test may further include identification and/or testing of the client device's hardware and/or software configuration. For example, the client device's hardware configuration may be identified as part of the stream test to determine the client device's processing abilities for purposes of, for example, decoding and/or decrypting video data to generate video content for rendering. Further, the client device's software configuration may be identified as part of the stream test to determine whether updates are available and recommended or required for purposes of game streaming. For example, a decoder or decryption software update may need to be applied to the client device to optimize the game streaming.

At method operation 1110, the stream test is completed. Based on the results of the stream test, parameters for the streaming of the cloud video game may be set, including without limitation, parameters for the execution of the cloud video game by the game machine parameters for the encoding/encryption of video content generated by the execution of the cloud video game, parameters for the decoding/decryption of video data received by the client device, and/or parameters for the sending of input data from the client device to the cloud gaming machine.

After completion of the stream test and after the game machine has been initialized, the interactive gameplay of the cloud video game is initiated, and the first video content from the cloud video game is streamed. It will be appreciated that streaming of video content from the cloud video game can entail generation of video content by the execution of the cloud video game by the game machine, encoding/encryption of the generated video content into video data, transmission of the video data to the client device, and decoding/decryption of the transmitted video data into video content for rendering by the client device to a display.

Figure 12:
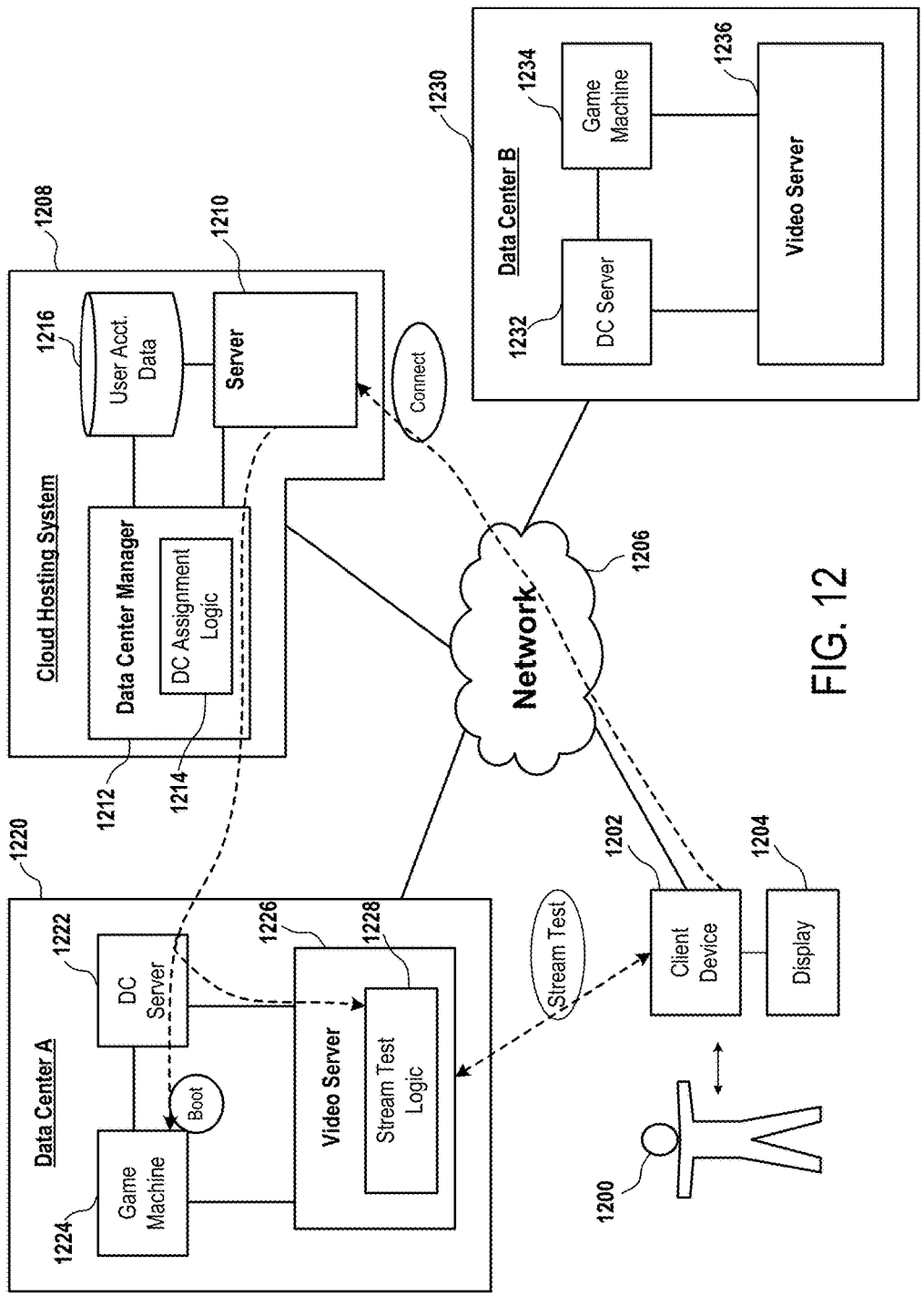
FIG. 12 illustrates a system for providing cloud gaming services that is configured to perform a stream test with a client device, in accordance with implementations of the disclosure.

FIG. 12 illustrates a system for providing cloud gaming services that is configured to perform a stream test with a client device, in accordance with implementations of the disclosure. In the illustrated implementation, a cloud gaming system is defined to include a cloud hosting system 1208 and data centers 1220 and 1230. The cloud hosting system 1208 includes a server 1210 that receives requests over network 1206 from a client device 1202, through which a user 1200 interfaces with the cloud gaming system. The server 1210 may access user account data 1216 that is associated with the user's account on the cloud gaming system, and retrieve data to respond to requests from the client device 1202.

The server 1210 may receive a request from the client device 1202 to initiate streaming gameplay of a cloud video game, and in response, the server 1210 activates data center manager 1212 having a data center assignment logic 1214 that is configured to assign the client device 1202 to a data center to instantiate a session of the cloud video game and from which the cloud video game will be streamed. It will be appreciated that the data center assignment logic 1214 may assign the client device 1202 to a given data center based on a variety of factors, as noted above, including the location of the client device 1202 and its proximity to the data centers, network conditions, availability of game machines at the data centers, preloaded/unloaded status of game machines at the data centers, data center utilization, load balancing, a (most) recently used data center by the user 1200, etc.

In the illustrated implementation, the client device 1202 has been assigned to the data center 1220. Thus, the data center manager communicates to the data center server 1222 the requested video game, and the data center server initiates the initialization of a game machine 1224 for the requested video game. As noted above, the initialization can include booting of the game machine, loading of executable code of the cloud video game, as well as loading of user save data for the cloud video game. Simultaneous with the initialization of the game machine 1224, the data center server 1222 also activates stream test logic 1228 of the video server 1226 to carry out a stream test between the data center 1220 and the client device 1202.

In some implementations, the stream test logic 1228 is configured to send over the network 1206 encoded/encrypted test video data from the video server 1226 to the client device 1202 for decoding/decryption. In this manner, the transmission of video data over the network can be tested along with the decoding/decryption capabilities of the client device 1202. It will be appreciated that the stream test is carried out in parallel with the initialization of the game machine. This is facilitated in part by the separate functionality of the game machine and the video server, the former being configured to execute the cloud video game, and the latter being configured to handle video streaming duties. Thus, the video streaming can be tested simultaneous with the initialization of the cloud video game on the game machine. Though downstream video transmission has been discussed, it will be appreciated that upstream data transmission, such as for transmission of input data from the client device 1202 to the game machine 1224 may also be tested in parallel with the loading of the game machine.

In some implementations, if the results of the stream test do not meet certain requirements, or if it is determined that better results can be obtained from a different data center, then the client device 1202 may be reassigned to a different data center, such as data center 1230, which include similar componentry in the form of a data center server 1232, game machine 1234, and video server 1236. A similar stream test may be performed in parallel with initialization of the game machine 1234.

Figure 13:
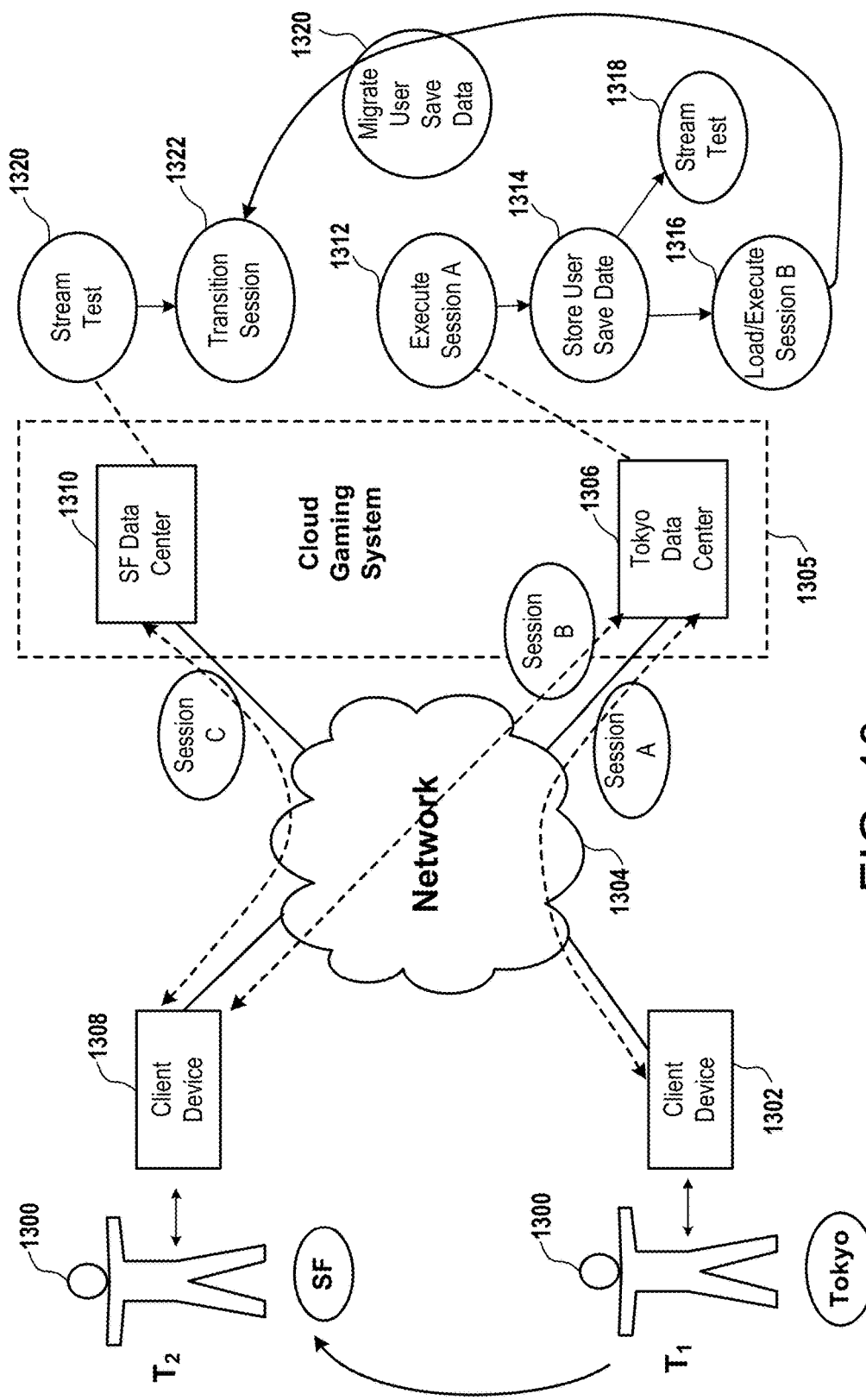
FIG. 13 conceptually illustrates transitioning of a gameplay session from one data center to another data center, in accordance with implementations of the disclosure.

FIG. 13 conceptually illustrates transitioning of a gameplay session from one data center to another data center, in accordance with implementations of the disclosure. At time $T_1$ a user 1300 is located in Tokyo (a first location) and operates a client device 1302 to access a cloud gaming system 1305 over a network 1304. The client device 1302 is assigned to a Tokyo data center 1306 that is proximate to the user 1300. A cloud video game is executed at the Tokyo data center 1306, as indicated by operation 1312, defining a session A of the cloud video game for the user 1300. The session A provides for interactive gameplay of the cloud video game, with video of the executing video game being streamed over the network 1304 from the Tokyo data center to the client device 1302, and input data from the client device 1302 being transmitted over the network 1304 to the Tokyo data center 1306 to drive the execution of the video game. At the conclusion of session A of the cloud video game, as indicated by operation 1314, the user save data is stored at the Tokyo data center.

At a subsequent time $T_2$ the user 1300 has moved to San Francisco (a second location). The user 1300 uses a client device 1308 (which may be the same or a different device than client device 1302), to access the cloud gaming system 1305. Though the user 1300 and his client device 1308 are no longer located in Tokyo, the user's save data for the cloud video game is still located at the Tokyo data center 1306. Therefore, upon receiving a request to initiate and/or resume gameplay of the cloud video game, the cloud gaming system 1305 institutes the gameplay at the Tokyo data center, so that the user's game save data can be readily loaded to a game machine, and minimize delay for the user. As indicated by operation 1316, the user's save data is loaded and the cloud video game is executed to define a session C, including streaming of video from the Tokyo data center 1306 to the client device 1308 in San Francisco, as well as transmission of input data from the client device 1308 back to the Tokyo data center 1306.

Substantially simultaneous with the loading and/or execution of the session B, a stream test or quality of service can be evaluated, as indicated at operation 1318. The cloud gaming system that streaming of the cloud video game in the current configuration is not optimal, and may further perform a stream test or quality of service evaluation for a San Francisco data center 1310, as indicated at operation 1320. The results may indicate that the gameplay session should be migrated to the San Francisco data center 1310, and therefore at operation 1320, the user save data for the cloud video game is migrated to the San Francisco data center 1310; and at operation 1322, the gameplay session is transitioned to the San Francisco data center 1310, defining a session C that is defined by execution of the cloud video game at the San Francisco data center 1310, including streaming of video from the San Francisco data center 1310 over the network 1304 to the client device 1308, and receipt of input data therefrom to drive the execution of the cloud video game.

In some embodiments, a client can be a general purpose computer, a special purpose computer, a portable gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 14:
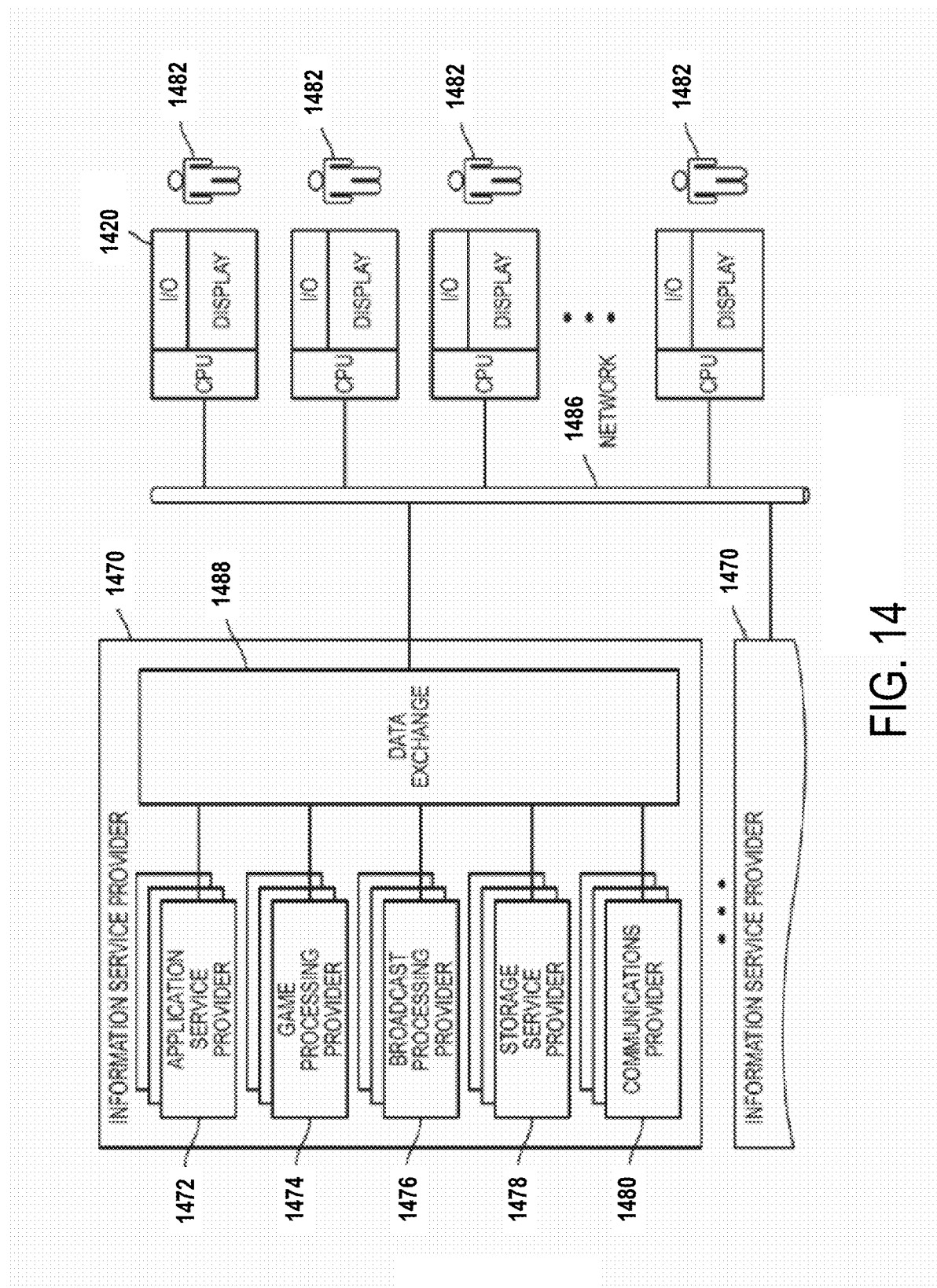
FIG. 14 illustrates an exemplary Information Service Provider architecture for delivering informational content and services to users who are geographically dispersed and connected via a network, in accordance with implementations of the disclosure.

FIG. 14 illustrates an embodiment of an Information Service Provider architecture. Information Service Providers (ISP) 1470 delivers a multitude of information services to users 1482 geographically dispersed and connected via network 1486. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1470 includes Application Service Provider (ASP) 1472, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1470 includes a Game Processing Server (GPS) 1474 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1476 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1478 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1480 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1488 interconnects the several modules inside ISP 1470 and connects these modules to users 1482 via network 1486. Data Exchange 1488 can cover a small area where all the modules of ISP 1470 are in close proximity, or can cover a large geographic area when the different modules are geographically dispersed. For example, Data Exchange 1488 can include a fast Gigabit Ethernet (or faster) within a cabinet of a data center, or an intercontinental virtual area network (VLAN).

Users 1482 access the remote services with client device 1484, which includes at least a CPU, a memory, a display and I/O. The client device can be a PC, a mobile phone, a netbook, tablet, gaming system, a PDA, etc. In one embodiment, ISP 1470 recognizes the type of device used by the client and adjusts the communication method employed. In other cases, client devices use a standard communications method, such as html, to access ISP 1470.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

Figure 15:
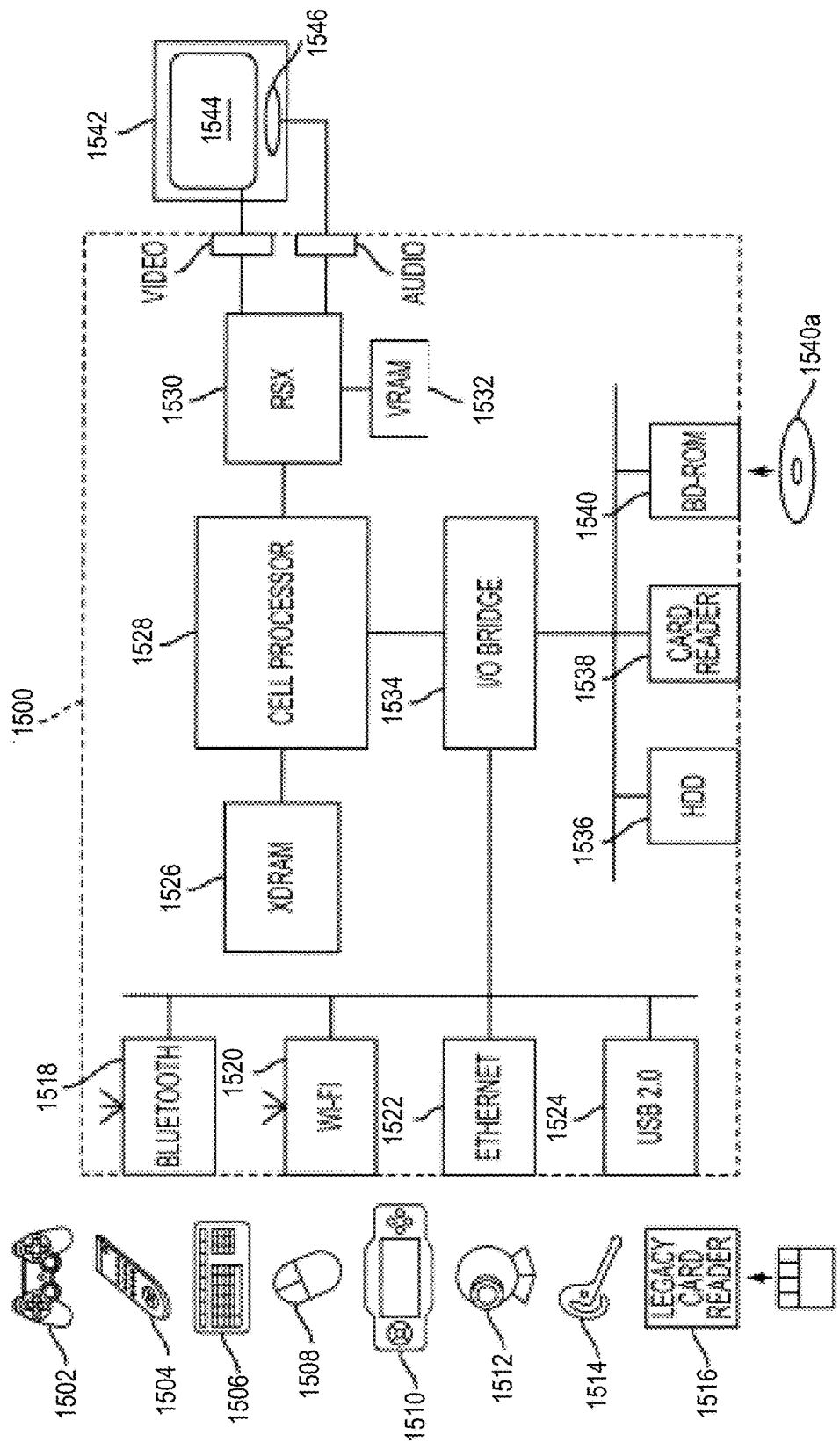
FIG. 15 illustrates exemplary components of a computing device used for controlling content presented to a user, in accordance with implementations of the disclosure.

FIG. 15 schematically illustrates the overall system architecture of a gaming console, such as Sony® Playstation 3® entertainment device, that may be compatible with controllers for implementing an avatar control system in accordance with one embodiment of the present disclosure. A system unit 1500 is provided, with various peripheral devices connectable to the system unit 1500. The system unit 1500 can in some implementations be a computing server. The system unit 1500 comprises: a Cell processor 1528; a Rambus® dynamic random access memory (XDRAM) unit 1526; a Reality Synthesizer graphics unit 1530 with a dedicated video random access memory (VRAM) unit 1532; and an I/O bridge 1534. The system unit 1500 also comprises a Blu Ray® Disk BD-ROM® optical disk reader 1540 for reading from a disk 1540a and a removable slot-in hard disk drive (HDD) 1536, accessible through the I/O bridge 1534. Optionally the system unit 1500 also comprises a memory card reader 1538 for reading compact flash memory cards, Memory Stick® memory cards and the like, which is similarly accessible through the I/O bridge 1534.

The I/O bridge 1534 also connects to six Universal Serial Bus (USB) 2.0 ports 1524; a gigabit Ethernet port 1522; an IEEE 802.11b/g wireless network (Wi-Fi) port 1520; and a Bluetooth® wireless link port 1518 capable of supporting of up to seven Bluetooth connections.

In operation the I/O bridge 1534 handles all wireless, USB and Ethernet data, including data from one or more game controllers 1502. For example when a user is playing a game, the I/O bridge 1534 receives data from the game controller 1502 via a Bluetooth link and directs it to the Cell processor 1528, which updates the current state of the game accordingly.

The wireless, USB and Ethernet ports also provide connectivity for other peripheral devices in addition to game controllers 1502, such as: a remote control 1504; a keyboard 1506; a mouse 1508; a portable entertainment device 1510 such as a Sony Playstation Portable® entertainment device; a video camera such as an EyeToy® video camera 1512; and a microphone headset 1514. Such peripheral devices may therefore in principle be connected to the system unit 1500 wirelessly; for example the portable entertainment device 1510 may communicate via a Wi-Fi ad-hoc connection, whilst the microphone headset 1514 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1516 may be connected to the system unit via a USB port 1524, enabling the reading of memory cards 1548 of the kind used by the Playstation® or Playstation 2® devices.

In the present embodiment, the game controller 1502 is operable to communicate wirelessly with the system unit 1500 via the Bluetooth link. However, the game controller 1502 can instead be connected to a USB port, thereby also providing power by which to charge the battery of the game controller 1502. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1504 is also operable to communicate wirelessly with the system unit 1500 via a Bluetooth link. The remote control 1504 comprises controls suitable for the operation of the Blu Ray™ Disk BD-ROM reader 1540 and for the navigation of disk content.

The Blu Ray™ Disk BD-ROM reader 1540 is operable to read CD-ROMs compatible with the Playstation and PlayStation 2 devices, in addition to conventional pre-recorded and recordable CDs, and so-called Super Audio CDs. The reader 1540 is also operable to read DVD-ROMs compatible with the Playstation 2 and PlayStation 3 devices, in addition to conventional pre-recorded and recordable DVDs. The reader 1540 is further operable to read BD-ROMs compatible with the Playstation 3 device, as well as conventional pre-recorded and recordable Blu-Ray Disks.

The system unit 1500 is operable to supply audio and video, either generated or decoded by the Playstation 3 device via the Reality Synthesizer graphics unit 1530, through audio and video connectors to a display and sound output device 1542 such as a monitor or television set having a display 1544 and one or more loudspeakers 1546. The audio connectors 1550 may include conventional analogue and digital outputs whilst the video connectors 1552 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1528. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1512 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1500. The camera LED indicator is arranged to illuminate in response to appropriate control data from the system unit 1500, for example to signify adverse lighting conditions. Embodiments of the video camera 1512 may variously connect to the system unit 1500 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 1500, an appropriate piece of software such as a device driver should be provided. Device driver technology is well-known and will not be described in detail here, except to say that the skilled man will be aware that a device driver or similar software interface may be required in the present embodiment described.

Figure 16:
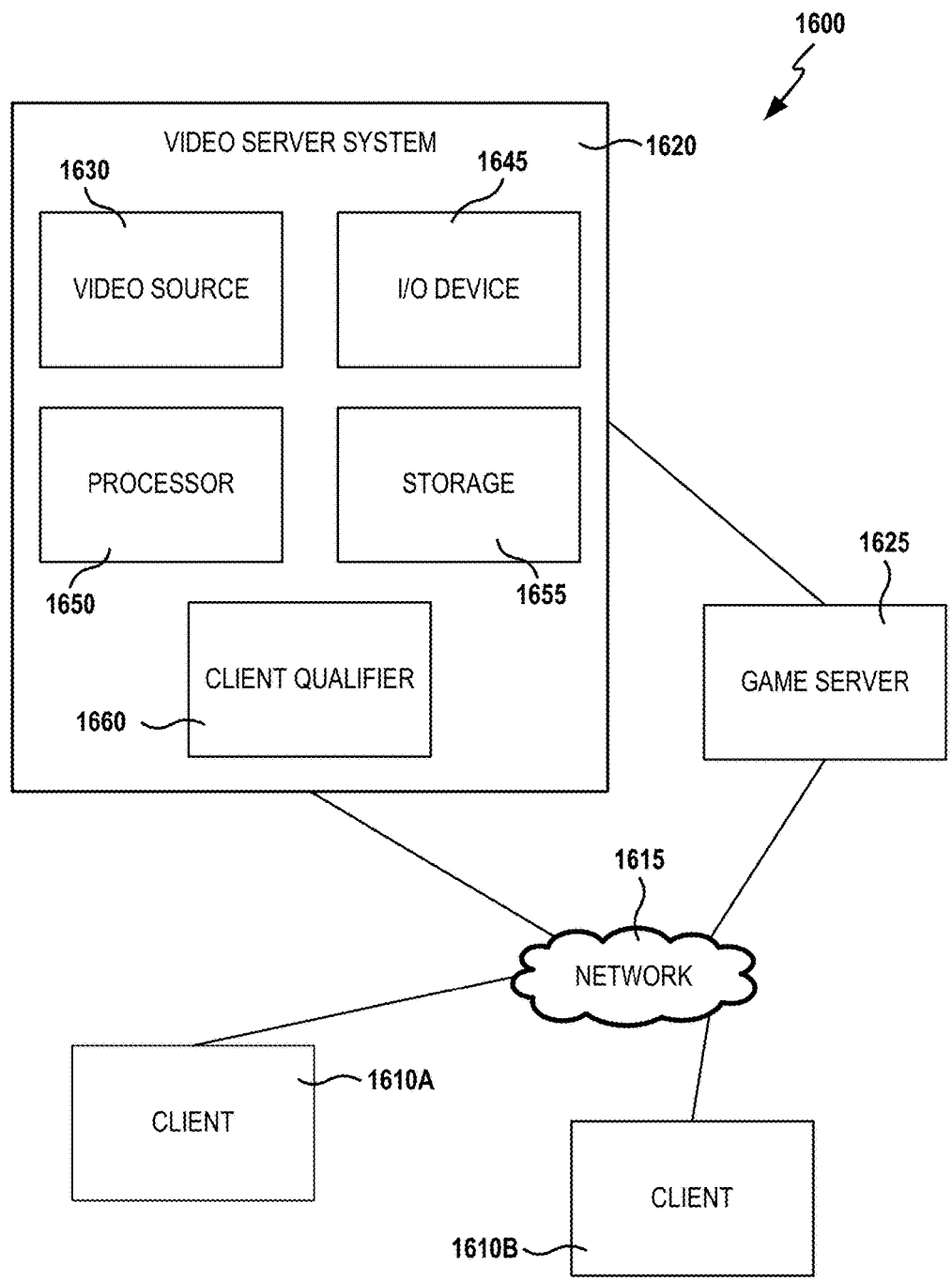
FIG. 16 is a block diagram of a Game System 1600, in accordance with implementations of the disclosure.

FIG. 16 is a block diagram of a Game System 1600, in accordance with implementations of the disclosure. Game System 1600 is configured to provide a video stream to one or more Clients 1610 via a Network 1615. Game System 1600 typically includes a Video Server System 1620 and an optional game server 1625. Video Server System 1620 is configured to provide the video stream to the one or more Clients 1610 with a minimal quality of service. For example, Video Server System 1620 may receive a game command that changes the state of or a point of view within a video game, and provide Clients 1610 with an updated video stream reflecting this change in state with minimal lag time. The Video Server System 1620 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1620 frames per second. Although higher or lower frame rates are included in alternative embodiments of the disclosure.

Clients 1610, referred to herein individually as 1610A., 1610B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1610 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1610 or on a separate device such as a monitor or television. Clients 1610 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1610 are optionally geographically dispersed. The number of clients included in Game System 1600 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1620 to deliver a game viewed through the HMD. In one embodiment, the game console receives the video stream from the video server system 1620, and the game console forwards the video stream, or updates to the video stream, to the HMD for rendering.

Clients 1610 are configured to receive video streams via Network 1615. Network 1615 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1610 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1610 may, but are not required to, further include systems configured for modifying received video. For example, a client may be configured to perform further rendering, to overlay one video image on another video image, to crop a video image, and/or the like. For example, Clients 1610 may be configured to receive various types of video frames, such as I-frames, P-frames and B-frames, and to process these frames into images for display to a user. In some embodiments, a member of Clients 1610 is configured to perform further rendering, shading, conversion to 3-D, or like operations on the video stream. A member of Clients 1610 is optionally configured to receive more than one audio or video stream. Input devices of Clients 1610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1610 is generated and provided by Video Server System 1620. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1610 are typically configured to receive inputs from a user. These inputs may include game commands configured to change the state of the video game or otherwise affect game play. The game commands can be received using input devices and/or may be automatically generated by computing instructions executing on Clients 1610. The received game commands are communicated from Clients 1610 via Network 1615 to Video Server System 1620 and/or Game Server 1625. For example, in some embodiments, the game commands are communicated to Game Server 1625 via Video Server System 1620. In some embodiments, separate copies of the game commands are communicated from Clients 1610 to Game Server 1625 and Video Server System 1620. The communication of game commands is optionally dependent on the identity of the command. Game commands are optionally communicated from Client 1610A through a different route or communication channel that that used to provide audio or video streams to Client 1610A.

Game Server 1625 is optionally operated by a different entity than Video Server System 1620. For example, Game Server 1625 may be operated by the publisher of a multi-player game. In this example, Video Server System 1620 is optionally viewed as a client by Game Server 1625 and optionally configured to appear from the point of view of Game Server 1625 to be a prior art client executing a prior art game engine. Communication between Video Server System 1620 and Game Server 1625 optionally occurs via Network 1615. As such, Game Server 1625 can be a prior art multiplayer game server that sends game state information to multiple clients, one of which is game server system 1620. Video Server System 1620 may be configured to communicate with multiple instances of Game Server 1625 at the same time. For example, Video Server System 1620 can be configured to provide a plurality of different video games to different users. Each of these different video games may be supported by a different Game Server 1625 and/or published by different entities. In some embodiments, several geographically distributed instances of Video Server System 1620 are configured to provide game video to a plurality of different users. Each of these instances of Video Server System 1620 may be in communication with the same instance of Game Server 1625. Communication between Video Server System 1620 and one or more Game Server 1625 optionally occurs via a dedicated communication channel. For example, Video Server System 1620 may be connected to Game Server 1625 via a high bandwidth channel that is dedicated to communication between these two systems.

Video Server System 1620 comprises at least a Video Source 1630, an I/O Device 1645, a Processor 1650, and non-transitory Storage 1655. Video Server System 1620 may include one computing device or be distributed among a plurality of computing devices. These computing devices are optionally connected via a communications system such as a local area network.

Video Source 1630 is configured to provide a video stream, e.g., streaming video or a series of video frames that form a moving picture. In some embodiments, Video Source 1630 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1625. Game Server 1625 may maintain a copy of the state of the game based on game commands received from multiple players using geographically disperse clients. In these cases, the game state is provided by Game Server 1625 to Video Source 1630, wherein a copy of the game state is stored and rendering is performed. Game Server 1625 may receive game commands directly from Clients 1610 via Network 1615, and/or may receive game commands via Video Server System 1620.

Video Source 1630 typically includes rendering logic, e.g., hardware, firmware, and/or software stored on a computer readable medium such as Storage 1655. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1610. For example, the raw video may be encoded according to an Adobe Flash® standard, .wav, H.265, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1630 includes a video recording device such as a camera. This camera may be used to generate delayed or live video that can be included in the video stream of a computer game. The resulting video stream, optionally includes both rendered images and images recorded using a still or video camera. Video Source 1630 may also include storage devices configured to store previously recorded video to be included in a video stream. Video Source 1630 may also include motion or positioning sensing devices configured to detect motion or position of an object, e.g., person, and logic configured to determine a game state or produce video-based on the detected motion and/or position.

Video Source 1630 is optionally configured to provide overlays configured to be placed on other video. For example, these overlays may include a command interface, log in instructions, messages to a game player, images of other game players, video feeds of other game players (e.g., webcam video). In embodiments of Client 1610A including a touch screen interface or a gaze detection interface, the overlay may include a virtual keyboard, joystick, touch pad, and/or the like. In one example of an overlay a player's voice is overlaid on an audio stream. Video Source 1630 optionally further includes one or more audio sources.

In embodiments wherein Video Server System 1620 is configured to maintain the game state based on input from more than one player, each player may have a different point of view comprising a position and direction of view. Video Source 1630 is optionally configured to provide a separate video stream for each player based on their point of view. Further, Video Source 1630 may be configured to provide a different frame size, frame data size, and/or encoding to each of Client 1610. Video Source 1630 is optionally configured to provide 3-D video.

I/O Device 1645 is configured for Video Server System 1620 to send and/or receive information such as video, commands, requests for information, a game state, gaze information, device motion, device location, user motion, client identities, player identities, game commands, security information, audio, and/or the like. I/O Device 1645 typically includes communication hardware such as a network card or modem. I/O Device 1645 is configured to communicate with Game Server 1625, Network 1615, and/or Clients 1610.

Processor 1650 is configured to execute logic, e.g. software, included within the various components of Video Server System 1620 discussed herein. For example, Processor 1650 may be programmed with software instructions in order to perform the functions of Video Source 1630, Game Server 1625, and/or a Client Qualifier 1660. Video Server System 1620 optionally includes more than one instance of Processor 1650. Processor 1650 may also be programmed with software instructions in order to execute commands received by Video Server System 1620, or to coordinate the operation of the various elements of Game System 1600 discussed herein. Processor 1650 may include one or more hardware device. Processor 1650 is an electronic processor.

Storage 1655 includes non-transitory analog and/or digital storage devices. For example, Storage 1655 may include an analog storage device configured to store video frames. Storage 1655 may include a computer readable digital storage, e.g. a hard drive, an optical drive, or solid state storage. Storage 1615 is configured (e.g. by way of an appropriate data structure or file system) to store video frames, artificial frames, a video stream including both video frames and artificial frames, audio frame, an audio stream, and/or the like. Storage 1655 is optionally distributed among a plurality of devices. In some embodiments, Storage 1655 is configured to store the software components of Video Source 1630 discussed elsewhere herein. These components may be stored in a format ready to be provisioned when needed.

Video Server System 1620 optionally further comprises Client Qualifier 1660. Client Qualifier 1660 is configured for remotely determining the capabilities of a client, such as Clients 1610A or 1610B. These capabilities can include both the capabilities of Client 1610A itself as well as the capabilities of one or more communication channels between Client 1610A and Video Server System 1620. For example, Client Qualifier 1660 may be configured to test a communication channel through Network 1615.

Client Qualifier 1660 can determine (e.g., discover) the capabilities of Client 1610A manually or automatically. Manual determination includes communicating with a user of Client 1610A and asking the user to provide capabilities. For example, in some embodiments, Client Qualifier 1660 is configured to display images, text, and/or the like within a browser of Client 1610A. In one embodiment, Client 1610A is an HMD that includes a browser. In another embodiment, client 1610A is a game console having a browser, which may be displayed on the HMD. The displayed objects request that the user enter information such as operating system, processor, video decoder type, type of network connection, display resolution, etc. of Client 1610A. The information entered by the user is communicated back to Client Qualifier 1660.

Automatic determination may occur, for example, by execution of an agent on Client 1610A and/or by sending test video to Client 1610A. The agent may comprise computing instructions, such as java script, embedded in a web page or installed as an add-on. The agent is optionally provided by Client Qualifier 1660. In various embodiments, the agent can find out processing power of Client 1610A, decoding and display capabilities of Client 1610A, lag time reliability and bandwidth of communication channels between Client 1610A and Video Server System 1620, a display type of Client 1610A, firewalls present on Client 1610A, hardware of Client 1610A, software executing on Client 1610A, registry entries within Client 1610A, and/or the like.

Client Qualifier 1660 includes hardware, firmware, and/or software stored on a computer readable medium. Client Qualifier 1660 is optionally disposed on a computing device separate from one or more other elements of Video Server System 1620. For example, in some embodiments, Client Qualifier 1660 is configured to determine the characteristics of communication channels between Clients 1610 and more than one instance of Video Server System 1620. In these embodiments the information discovered by Client Qualifier can be used to determine which instance of Video Server System 1620 is best suited for delivery of streaming video to one of Clients 1610.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method, comprising:
receiving, over a network by a cloud gaming server computer, a request from a client device to initiate gameplay of a cloud video game;
responsive to the request, assigning the client device to a first data center from which to stream the gameplay of the cloud video game;
responsive to the request, initiating transfer of user save data, that is for the cloud video game and is associated with a user account associated with the client device, over the network from a second data center to the first data center;
loading the cloud video game on a cloud gaming machine at the first data center, the loading of the cloud video game including loading of generic save data, wherein the generic save data defines parameters sufficient to initiate gameplay of the cloud video game, and wherein the generic save data is not associated with any specific user of the cloud video game;
before applying the user save data, initiating interactive gameplay of the cloud video game with the generic save data by streaming video data, generated from execution of the cloud video game by the cloud gaming machine, to the client device, and receiving input data from the client device to drive the execution of the cloud video game;
during the interactive gameplay, completing the transfer of the user save data to the first data center;
after the initiating the interactive gameplay of the cloud video game, applying the user save data to update the execution of the cloud video game by the cloud gaming machine at the first data center.

2. The method of claim 1, wherein the generic save data includes first values for one or more variables defined by the execution of the cloud video game.

3. The method of claim 2, wherein the user save data includes second values for the one or more variables, the second values being defined from a prior execution of the cloud video game that was associated with the user account, the applying of the user save data including updating the one or more variables with the second values.

4. The method of claim 3, wherein applying the user save data to update the execution of the cloud video game is performed during the interactive gameplay, such that execution of the cloud video game and the interactive gameplay continue as the user save data is applied to update the one or more variables.

5. The method of claim 3, wherein applying the user save data to update the execution of the cloud video game includes identifying a break point in the cloud video game, wherein the execution of the cloud video game and the interactive gameplay are paused, and applying the user save data for gameplay during the break point in the cloud video game.

6. The method of claim 1, wherein loading the cloud video game on the cloud gaming machine is performed in response to the request from the client device to initiate gameplay of the cloud video game.

7. A method, comprising:
receiving, over a network by a cloud gaming server computer, a request from a client device to initiate gameplay of a cloud video game;
responsive to the request, assigning the client device to a first data center from which to stream the gameplay of the cloud video game;
responsive to the request, initiating transfer of user save data, that is for the cloud video game and is associated with a user account associated with the client device, over the network from a second data center to the first data center, the user save data being generated from prior gameplay of the cloud video game that is associated with the user account;
loading the cloud video game on a cloud gaming machine at the first data center, the loading of the cloud video game including loading of generic save data, wherein the generic save data defines parameters sufficient to initiate gameplay of the cloud video game, wherein the generic save data is not generated as a result of gameplay of the cloud video game, and wherein the generic save data is not associated with any specific user of the cloud video game;
before applying the user save data, initiating interactive gameplay of the cloud video game with the generic save data by streaming video data, generated from execution of the cloud video game by the cloud gaming machine without applying the user save data, to the client device, and receiving input data from the client device to drive the execution of the cloud video game without applying the user save data;

during the interactive gameplay, completing the transfer of the user save data to the first data center;

after the initiating the interactive gameplay of the cloud video game, applying the user save data to update the execution of the cloud video game by the cloud gaming machine at the first data center, wherein applying the user save data changes the parameters that were initially defined by the generic save data.

8. The method of claim 7, wherein the generic save data includes first values for one or more variables defined by the execution of the cloud video game.

9. The method of claim 8, wherein the user save data includes second values for the one or more variables, the second values being defined from a prior execution of the cloud video game that was associated with the user account, the applying of the user save data including updating the one or more variables with the second values.

10. The method of claim 9, wherein applying the user save data to update the execution of the cloud video game is performed during the interactive gameplay, such that execution of the cloud video game and the interactive gameplay continue as the user save data is applied to update the one or more variables.

11. The method of claim 9, wherein applying the user save data to update the execution of the cloud video game includes identifying a break point in the cloud video game, wherein the execution of the cloud video game and the interactive gameplay are paused, and applying the user save data for gameplay during the break point in the cloud video game.

12. The method of claim 7, wherein loading the cloud video game on the cloud gaming machine is performed in response to the request from the client device to initiate gameplay of the cloud video game.

13. A non-transitory computer readable medium having program instructions embodied thereon, the program instructions configured, when executed by at least one processor, to perform a method including the following operations:

receiving, over a network by a cloud gaming server computer, a request from a client device to initiate gameplay of a cloud video game;

responsive to the request, assigning the client device to a first data center from which to stream the gameplay of the cloud video game;

responsive to the request, initiating transfer of user save data, that is for the cloud video game and is associated with a user account associated with the client device, over the network from a second data center to the first data center;

loading the cloud video game on a cloud gaming machine at the first data center, the loading of the cloud video game including loading of generic save data, wherein the generic save data defines parameters sufficient to initiate gameplay of the cloud video game, and wherein the generic save data is not associated with any specific user of the cloud video game;

before applying the user save data, initiating interactive gameplay of the cloud video game with the generic save data by streaming video data, generated from execution of the cloud video game by the cloud gaming machine, to the client device, and receiving input data from the client device to drive the execution of the cloud video game;

during the interactive gameplay, completing the transfer of the user save data to the first data center;

after the initiating the interactive gameplay of the cloud video game, applying the user save data to update the execution of the cloud video game by the cloud gaming machine at the first data center.

14. The non-transitory computer readable medium of claim 13, wherein the generic save data includes first values for one or more variables defined by the execution of the cloud video game.

15. The non-transitory computer readable medium of claim 14, wherein the user save data includes second values for the one or more variables, the second values being defined from a prior execution of the cloud video game that was associated with the user account, the applying of the user save data including updating the one or more variables with the second values.

16. The non-transitory computer readable medium of claim 15, wherein applying the user save data to update the execution of the cloud video game is performed during the interactive gameplay, such that execution of the cloud video game and the interactive gameplay continue as the user save data is applied to update the one or more variables.

17. The non-transitory computer readable medium of claim 15, wherein applying the user save data to update the execution of the cloud video game includes identifying a break point in the cloud video game, wherein the execution of the cloud video game and the interactive gameplay are paused, and applying the user save data for gameplay during the break point in the cloud video game.

18. The non-transitory computer readable medium of claim 13, wherein loading the cloud video game on the cloud gaming machine is performed in response to the request from the client device to initiate gameplay of the cloud video game.

* * * * *